United States Patent
Yamamoto et al.

(10) Patent No.: US 8,238,020 B2
(45) Date of Patent: Aug. 7, 2012

(54) ELECTROPHORETIC DISPLAY SHEET PRODUCTIONS PROCESS, ELECTROPHORETIC DISPLAY SHEET, ELECTROPHORETIC DISPLAY DEVICE, AND ELECTRONIC APPARATUS

(75) Inventors: Hitoshi Yamamoto, Chino (JP); Akira Matsumoto, Chino (JP); Takeo Kawase, Suwa (JP); Hironobu Hashimoto, Kawanishi (JP)

(73) Assignee: Seiko Epson Corporation, Tokyo (JP)

( * ) Notice: Subject to any disclaimer, the term of this patent is extended or adjusted under 35 U.S.C. 154(b) by 30 days.

(21) Appl. No.: 12/894,500

(22) Filed: Sep. 30, 2010

(65) Prior Publication Data

US 2011/0080633 A1  Apr. 7, 2011

(30) Foreign Application Priority Data

Oct. 6, 2009 (JP) ................................ 2009-232808
Aug. 31, 2010 (JP) ................................ 2010-194383

(51) Int. Cl.
*G02B 26/00* (2006.01)
*G09G 3/34* (2006.01)

(52) U.S. Cl. .......... 359/296; 359/253; 345/107; 345/76; 345/211; 345/690; 204/600

(58) Field of Classification Search .................. 359/252, 359/253, 296; 345/76, 88, 106–108, 204, 345/690; 349/89, 156; 445/24; 264/1
See application file for complete search history.

(56) References Cited

U.S. PATENT DOCUMENTS

| | | | |
|---|---|---|---|
| 6,597,340 B1 * | 7/2003 | Kawai ........................... | 345/107 |
| 6,844,958 B2 * | 1/2005 | Kawai ........................... | 359/296 |
| 7,193,770 B2 | 3/2007 | Kanbe | |
| 7,301,524 B2 * | 11/2007 | Kawai ........................... | 345/107 |
| 7,307,780 B2 | 12/2007 | Kanbe | |
| 7,804,638 B2 * | 9/2010 | Yamamoto ..................... | 359/296 |
| 7,964,076 B2 * | 6/2011 | Kanbe ........................... | 204/600 |
| 7,999,997 B2 * | 8/2011 | Komatsu et al. .............. | 359/296 |
| 8,081,375 B2 * | 12/2011 | Komatsu et al. .............. | 359/296 |
| 2009/0059349 A1 | 3/2009 | Yamamoto et al. | |
| 2009/0061209 A1 | 3/2009 | Yamamoto et al. | |
| 2010/0020385 A1 | 1/2010 | Yamamoto et al. | |
| 2010/0245984 A1 * | 9/2010 | Yamamoto ..................... | 359/296 |

FOREIGN PATENT DOCUMENTS

| | | |
|---|---|---|
| JP | A 2007-58151 | 3/2007 |
| JP | A 2008-165191 | 7/2008 |
| JP | A 2009-53447 | 3/2009 |
| JP | A 2009-62420 | 3/2009 |

* cited by examiner

*Primary Examiner* — Loha Ben
(74) *Attorney, Agent, or Firm* — Oliff & Berridge, PLC

(57) ABSTRACT

Provided is a method of producing an electrophoretic display sheet having a substrate and a microcapsule-containing layer disposed on one surface side of the substrate and including microcapsules and a binder holding the microcapsules, the microcapsules each composed of a shell and an electrophoretic dispersion liquid sealed in the shell and containing at least one type of electrophoretic particles. The method includes the step of forming the microcapsule-containing layer where the microcapsules are arranged in a single layer without overlapping in the thickness direction of the substrate by supplying a microcapsule dispersion containing the microcapsules and the binder onto the substrate and then pressurizing the microcapsule dispersion in the thickness direction of the substrate.

15 Claims, 10 Drawing Sheets

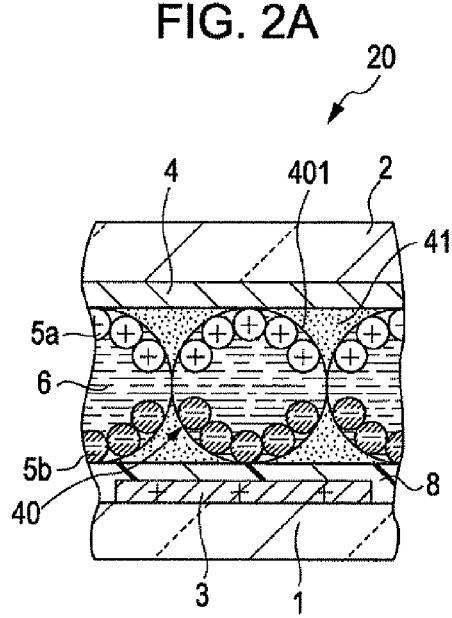
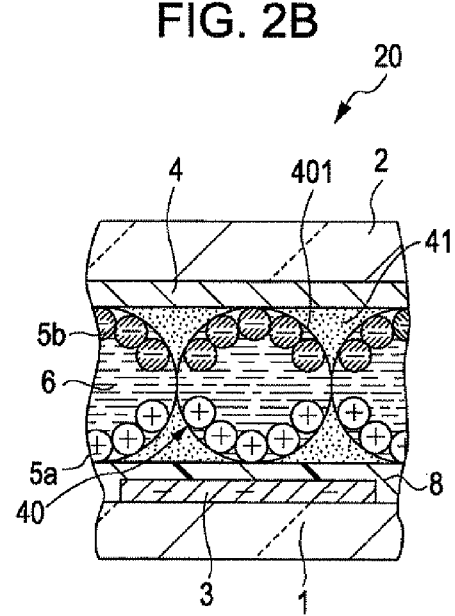
FIG. 2A
FIG. 2B

PRESSURIZATION

PRESSURIZATION

ELECTROPHORETIC DISPLAY SHEET PRODUCTIONS PROCESS, ELECTROPHORETIC DISPLAY SHEET, ELECTROPHORETIC DISPLAY DEVICE, AND ELECTRONIC APPARATUS

This application claims priority to Japanese patent applications No. 2009-232808 filed Oct. 6, 2009 and No. 2010-194383 filed Aug. 31, 2010, and the said application is herein incorporated in the present specification.

BACKGROUND

1. Technical Field

The invention relates to an electrophoretic display sheet production process, an electrophoretic display sheet, an electrophoretic display device, and an electronic apparatus.

2. Related Art

In a dispersion system where microparticles are dispersed in a liquid, it is generally known that the microparticles migrate (are electrophoresed) in the liquid by a Coulomb force caused by applying an electric field. This phenomenon is called electrophoresis, and, recently, electrophoretic display devices, which display desired information (image) using the electrophoresis, have been attracting attentions as new display devices.

The electrophoretic display devices have characteristics that they have a display memory property at the time of stoppage of voltage application and a wide viewing angle and are capable of high contrast displaying at low power consumption.

The electrophoretic display device is a reflection-type display using natural light as a light source. In order to realize high visibility, high transparency at its light-transmitting portion, high reflectance at its light-reflecting portion, and high absorption at its light-absorbing portion are required to be achieved.

As a known electrophoretic display device, JP-A-2007-058151 discloses an electrophoretic display device where a microcapsule-containing layer including multiple microcapsules and a binder is disposed between and joined to a pair of substrates.

Here, in the microcapsules, electrophoretic particles are dispersed in an electrophoretic dispersion liquid sealed in a wall material (forming shells). As the material of the shells, a relatively flexible material, for example, a composite material of gum arabic and gelatin has been widely used. When the shells are made of a flexible material, the microcapsules in the microcapsule-containing layer disposed between two substrates are compressed by the substrates and thereby deformed. Therefore, in the resulting microcapsule-containing layer, microcapsules are crushed in the vertical direction (stone-wall structure).

The microcapsules having shells made of a flexible material are insufficient in pressure resistance (to endure an applied pressure without causing crushing of the microcapsules) and bleed resistance (to prevent dissipation of the dispersion liquid sealed in the microcapsules). As a result, breakage of the microcapsules or leakage of the dispersion is easily caused by impact or pressing force applied during the display device is used or stored, and therefore there is a problem of difficulty in operating the electrophoretic display device stably for a long time.

In order to solve such a problem, for example, proposed is an electrophoretic display device including microcapsules having relatively strong shells made of a plurality of layers: a layer made of an epoxy resin and a layer made of a melamine resin (for example, see JP-A-2008-165191).

By forming the microcapsules in such a structure, the approximately spherical shapes of the microcapsules can be maintained even when the microcapsule-containing layer containing the microcapsules is disposed between the two substrates. Therefore, breakage of the microcapsules or leakage of the dispersion liquid can be surely prevented even if impact or pressing force is applied during the display device is used or stored.

In the electrophoretic display device having approximately spherical microcapsules in the state that the microcapsule-containing layer is disposed between two substrates, in order to obtain higher contrast, it is necessary to arrange the microcapsules in the microcapsule-containing layer so as to be in contact with one another in the lateral direction and to form a single layer without overlapping in the thickness direction.

SUMMARY

An advantage of some aspects of the invention is to provide a method of producing an electrophoretic display sheet exhibiting high contrast, an electrophoretic display sheet produced by the method, an electrophoretic display device having high reliability, and also an electronic apparatus having high reliability.

The advantage is achieved by the following invention.

The method according to an aspect of the invention is a method of producing an electrophoretic display sheet having:
a substrate; and
a microcapsule-containing layer disposed on one surface side of the substrate and including microcapsules and a binder holding the microcapsules, the microcapsules each composed of a shell and an electrophoretic dispersion liquid sealed in the shell and containing at least one type of electrophoretic particles, the method including the step of:
forming the microcapsule-containing layer where the microcapsules are arranged in a single layer without overlapping in the thickness direction of the substrate by supplying a microcapsule dispersion containing the microcapsules and the binder onto the substrate and then pressurizing the microcapsule dispersion in the thickness direction of the substrate.

By doing so, the produced electrophoretic display sheet exhibits high contrast.

In the method of producing an electrophoretic display sheet according to an aspect of the invention, the microcapsules are preferably arranged in the microcapsule-containing layer so as to be in contact with one another in the lateral direction of the substrate.

By doing so, an electrophoretic display sheet exhibiting high contrast can be produced.

In the method of producing an electrophoretic display sheet according to an aspect of the invention, the microcapsules are preferably present in approximately spherical shapes in the microcapsule-containing layer.

In the method of producing an electrophoretic display sheet according to an aspect of the invention, a ratio of the microcapsule width to the microcapsule height (width/height) of the microcapsules) is preferably 1.0 or more and 1.2 or less.

A microcapsule having an ellipticity in such a range can be referred to as being approximately spherical.

In the method of producing an electrophoretic display sheet according to an aspect of the invention, the content percentage of the microcapsules in the microcapsule-containing layer is preferably 50 wt % or more and 95 wt % or less.

A content of the microcapsules adjusted within this range is very advantageous for moving and arranging the microcapsules in the microcapsule-containing layer by pressurizing the microcapsules in the thickness direction of the microcapsule-containing layer such that the microcapsules are in contact with one another in the lateral direction and do not overlap in the thickness direction.

In the method of producing an electrophoretic display sheet according to an aspect of the invention, the binder preferably has a glass transition temperature of −50° C. or more and 10° C. or less.

By doing so, the microcapsules can be easily moved and arranged by pressurization in the thickness direction of the microcapsule-containing layer. Therefore, the microcapsules can be arranged in the microcapsule-containing layer so as to be in contact with one another in the lateral direction and to form a single layer without overlapping in the thickness direction.

In the method of producing an electrophoretic display sheet according to an aspect of the invention, the binder preferably contains a polyalkylene glycol resin having a weight average molecular weight of 200 or more and 100000 or less.

By doing so, the microcapsules can be easily moved and arranged by pressurization in the thickness direction of the microcapsule-containing layer. Therefore, the microcapsules can be arranged in the microcapsule-containing layer in a single layer without overlapping in the thickness direction.

In the method of producing an electrophoretic display sheet according to an aspect of the invention, the pressurization of the microcapsule dispersion in the thickness direction of the substrate is preferably performed by preparing a plate-like pressing substrate, disposing the pressing substrate on the microcapsule dispersion on the opposite side of the substrate, and pressurizing the microcapsule dispersion in the direction that the substrate and the pressing substrate come closer to each other.

By doing so, the entire microcapsule dispersion supplied on the substrate can be uniformly pressurized. Therefore, the microcapsules can be certainly arranged over the entire microcapsule dispersion liquid in such a manner that the microcapsules are in contact with one another in the lateral direction of the substrate and forming a single layer without overlapping in the thickness direction.

In the method of producing an electrophoretic display sheet according to an aspect of the invention, the intensity of the pressure applied between the substrate and the pressing substrate is preferably 0.4 MPa or more and 1.5 MPa or less.

By applying a pressure of such a degree of intensity between the substrate and the pressing substrate, the microcapsules contained in the microcapsule dispersion can move in the microcapsule dispersion liquid while maintaining the approximately spherical shapes without being compressed (pressed) in the vertical direction, and the microcapsules are eventually arranged so as to be in contact with one another in the lateral direction of the substrate and to form a single layer without overlapping in the thickness direction.

In the method of producing an electrophoretic display sheet according to an aspect of the invention, the pressing substrate is preferably detached from the microcapsule dispersion after pressurizing the microcapsule dispersion in the direction that the substrate and the pressing substrate come closer to each other.

By doing so, the pressing substrate can be selected so as to be suitable for the pressurization of the microcapsule dispersion.

In the method of producing an electrophoretic display sheet according to an aspect of the invention, the pressing substrate is preferably composed of a base material and a release agent layer formed on the surface of the base material.

By doing so, the pressing substrate can be easily detached from the formed microcapsule-containing layer.

In the method of producing an electrophoretic display sheet according to an aspect of the invention, the release agent layer is preferably constituted of a main material being at least one selected from the group consisting of silicone release agents, fluorine release agents, and modified silicone release agents.

The release agent layer constituted of such a material as the main material suitably exhibits the function as a release agent layer.

The electrophoretic display sheet according to an aspect of the invention is produced by the method of producing an electrophoretic display sheet according to an aspect of the invention.

By doing so, the electrophoretic display sheet can exhibit high contrast.

The electrophoretic display device according to an aspect of the invention includes the electrophoretic display sheet of the invention.

By doing so, the electrophoretic display device can exhibit high contrast.

The electronic apparatus according to an aspect of the invention includes the electrophoretic display device of the invention.

By doing so, the electronic apparatus can have high reliability.

BRIEF DESCRIPTION OF THE DRAWINGS

The invention will be described with reference to the accompanying drawings, wherein like numbers reference like elements.

FIGS. 2A and 2B are schematic diagrams illustrating the operating principle of the electrophoretic display device shown in FIG. 1.

DESCRIPTION OF EXEMPLARY EMBODIMENTS

The electrophoretic display sheet production process, the electrophoretic display sheet, the electrophoretic display device, and the electronic apparatus according to the invention will now be described in detail based on exemplary embodiments shown in the accompanied drawings.

1. Electrophoretic Display Device

First, an electrophoretic display device (electrophoretic display device of the invention) to which the electrophoretic display sheet according to an aspect of the invention is applied will be described.

Figure 1:
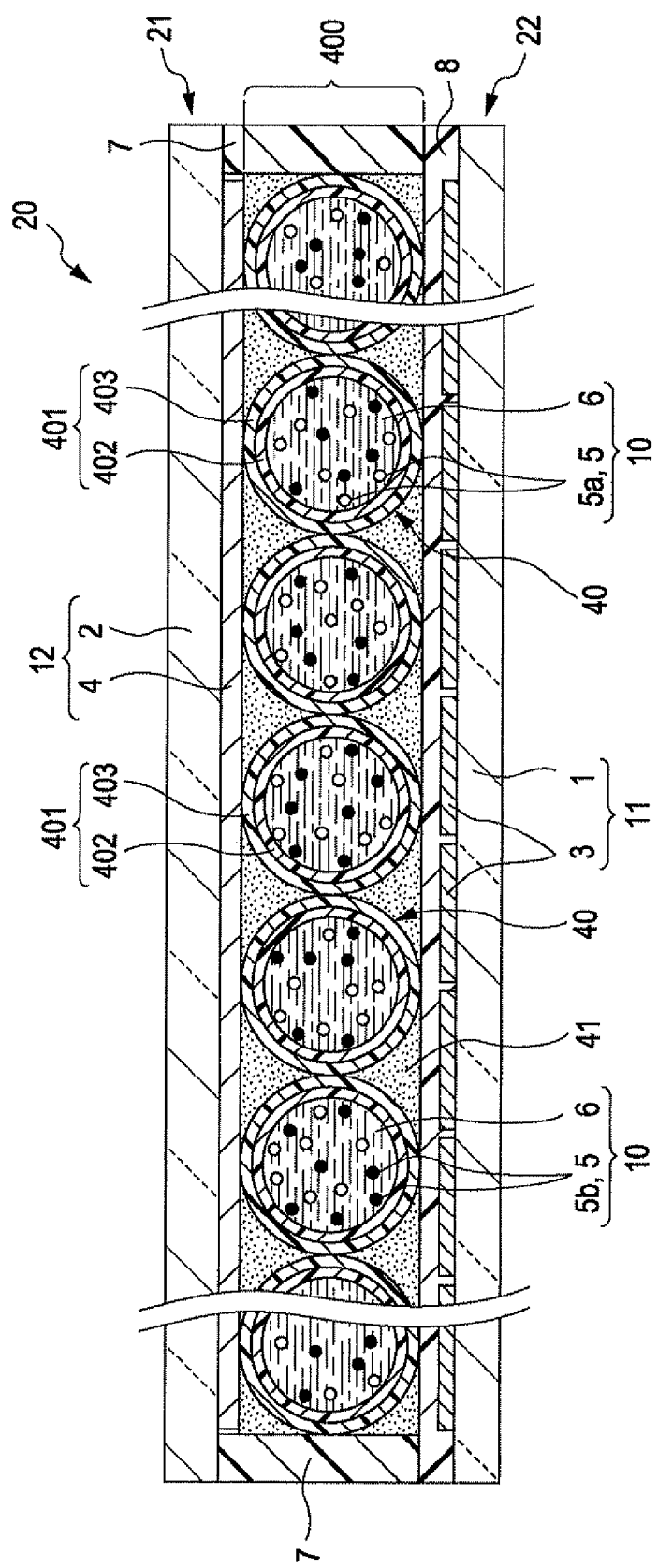
FIG. 1 is a diagram (longitudinal sectional view) schematically illustrating an embodiment of the electrophoretic display device of the invention.

FIG. 1 is a diagram (longitudinal sectional view) schematically illustrating an embodiment of the electrophoretic display device of the invention. Note that, hereinafter, the upper side in FIG. 1 is referred to as "upper", and the lower side is referred to as "lower", for convenience of explanation.

The electrophoretic display device 20 shown in FIG. 1 includes an electrophoretic display sheet (front plane) 21, a circuit board (back plane) 22, and an adhesive layer 8 joining the electrophoretic display sheet 21 and the circuit board 22.

The electrophoretic display sheet 21 includes a microcapsule-containing layer 400 disposed on a substrate 12 having a plate-like base 2 and a second electrode 4 disposed on the lower surface of the base 2 and composed of microcapsules 40 and a binder 41; and a sealing portion 7 airtightly sealing gaps between the base 2 and an opposing substrate 11.

The circuit board 22 includes the opposing substrate 11 having a plate-like base 1 and a plurality of first electrodes 3 disposed on the upper surface of the base 1; and a circuit (not shown) provided on the opposing substrate 11 (base 1) and including, for example, switching elements, such as TFTs.

The structure of each portion will be described below one by one.

The bases 1 and 2 are each made of a sheet-like (plate-like) member and have functions of supporting and protecting each member disposed therebetween.

Each of the bases 1 and 2 may be flexible or stiff, but is preferably flexible. The bases 1 and 2 having flexibility can give an electrophoretic display device 20 having flexibility, namely, an electrophoretic display device 20 being useful for constituting, for example, an electronic paper.

When each of the bases (base material layers) 1 and 2 is flexible, examples of the constituent material thereof include polyesters such as polyethylene terephthalate (PET) and polyethylene naphthalate (PEN), polyolefins such as polyethylene, modified polyolefins, polyamides, thermoplastic polyimides, polyethers, polyether ether ketones, various thermoplastic elastomers such as polyurethane- and polyethylene-based chloride elastomers, and their copolymers, blends, and polymer alloys containing them as main components. These may be used alone or in combination of two or more.

The average thicknesses of the bases 1 and 2 are each suitably determined depending on, for example, the constituent materials and the purposes and are not particularly limited. When the bases 1 and 2 have flexibility, the average thicknesses are each preferably about from 20 to 500 μm and more preferably about from 25 to 250 μm. By doing so, the electrophoretic display device 20 can be reduced in size (in particular, reduced in thickness) while maintaining a harmonious balance between flexibility and strength of the electrophoretic display device 20.

The bases 1 and 2 are provided with electrodes on their surfaces on the microcapsules 40 sides, that is, layer-like (film-like) first electrodes 3 are disposed on the upper surface of the base 1, and a second electrode 4 is disposed on the lower surface of the base 2.

An electric field is formed between the first electrode 3 and the second electrode 4 by applying a voltage between them, and this electric field acts on electrophoretic particles (display particles) 5.

In this embodiment, the second electrode 4 serves as a common electrode, and the first electrodes 3 are formed in a matrix form (line-column form) and serve as individual electrodes (pixel electrodes connected to switching elements), and a portion where the second electrode 4 overlaps one of the first electrodes 3 forms one pixel.

The second electrode 4 may be also divided into a plurality of electrodes, as in the first electrodes 3.

Furthermore, the first electrodes 3 may be strip-like electrodes and arranged so as to intersect with the second electrode 4 that is also formed as strip-like electrodes.

The constituent materials of the electrodes 3 and 4 are not particularly limited as long as they are substantially electrically conductive, and examples thereof include various electrically conductive materials, for example, metallic materials such as gold, silver, copper, aluminum, and their alloy; carbon materials such as carbon black; electron-conducting polymers such as polyacetylene, polyfluorene, and their derivatives; ion-conducting polymers in which ionic materials such as NaCl and $Cu(CF_3SO_3)_2$ are dispersed in matrix resins such as polyvinyl alcohol and polycarbonate; and electrically conductive oxides such as indium oxide (10), indium-tin oxide (ITO), and fluorine-doped tin oxide (FTO). These may be used alone or in combination of two or more.

The average thicknesses of the electrodes 3 and 4 are suitably determined depending on, for example, the constituent materials and purposes and are not particularly limited, but are each preferably about from 0.01 to 10 and more preferably about from 0.02 to 5

Among the bases 1 and 2 and electrodes 3 and 4, those disposed on the display surface side (the base 2 and the second electrode 4 in this embodiment) have light permeability, that is, they are each substantially transparent (colorless transparent, colored transparent, or semi-transparent). By doing so, the state of the electrophoretic particles 5 in an electrophoretic dispersion 10 described below, namely, information (image) displayed on the electrophoretic display device 20, can be visually recognized.

In the electrophoretic display sheet 21, the microcapsule-containing layer 400 is in contact with the lower surface of the second electrode 4.

In the microcapsule-containing layer 400, multiple microcapsules 40 are held by the binder 41. The microcapsules 40 are each composed of a capsule body (shell) 401 and the electrophoretic dispersion 10 sealed therein.

As shown in FIG. 1, the microcapsules 40 are arranged so as to be parallel to one another in the longitudinal and transverse directions between the opposing substrate 11 and the substrate 12 to form a single layer (one by one without overlapping in the thickness direction) and to extend over the entire thickness direction of the microcapsule-containing layer 400.

That is, the microcapsules 40 are arranged in the microcapsule-containing layer 400 in such a manner that the microcapsules 40 are in contact with adjacent microcapsules 40 in the lateral direction and are not stacked in the thickness direction.

Furthermore, in this embodiment, the microcapsules 40 are arranged in such a manner that one microcapsule 40 overlaps two adjacent first electrodes 3 and one first electrode 3 overlaps two adjacent microcapsules 40. The plurality of microcapsules can position above one first electrode 3.

By arranging the microcapsules 40 in such a manner, one first electrode 3 can operate electrophoretic particles 5 in two microcapsules 40 located thereon. As a result, different colors are displayed in one microcapsule 40.

In the invention, the thus arranged microcapsules 40 maintain their approximately spherical shapes (globular shapes) between the opposing substrate 11 and the substrate 12 without compressed (pressed) in the vertical direction even if they are sandwiched between the second electrode 4 and the adhesive layer 8.

In an electronic paper being required to be flexible to which the electrophoretic display device 20 of the invention is applied, when the electronic paper is bent, the electrophoretic display device 20 is also bent, and a pressure is applied between the circuit board 22 and the electrophoretic display sheet 21. As shown in FIG. 1, since the microcapsules 40 are in point contact with both the adhesive layer 8 and the second electrode 4, the load (pressure) per area applied to each contacting portion is increased to, specifically, about from 0.2 to 1.5 MPa when the electronic paper is bent.

The microcapsules 40 preferably have a strength that allows the microcapsules 40 to maintain the spherical shapes between the opposing substrate 11 and the substrate 12, even when such a pressure is applied between the circuit board 22 and the electrophoretic display sheet 21. By doing so, since the microcapsules 40 can be increased in both the pressure resistance and the bleed resistance, the electrophoretic display device 20 can be operated stably for a long time.

In this description, the term "pressure resistance of the microcapsules 40" refers to that "the microcapsules 40 endure without being crushed when a pressure is applied to the microcapsules 40", and the term "bleed resistance of the microcapsules 40" refers to that "the liquid-phase dispersion medium 6 sealed in microcapsules 40 is prevented from dissipating to the outside of the microcapsules 40".

It is preferable that the microcapsules 40 be present between the opposing substrate 11 and the substrate 12 in the state that the spherical shapes having higher sphericity are maintained. The degree of sphericity of the microcapsules 40 can be shown by a ratio of the microcapsule width to the microcapsule height (width/height of the microcapsules 40) as an index.

The value of (the average width of the microcapsules 40)/(the average height of the microcapsules 40) can be obtained by, for example, determining the average particle diameter for the height (thickness direction) and the average particle diameter for the width (lateral direction) of the microcapsules 40 in the microcapsule-containing layer 400 and calculating the ratio (width/height) from the determined average particle diameters.

The thus-determined ratio of (the average width of the microcapsules 40)/(the average height of the microcapsules 40) is preferably 1.0 or more and 1.2 or less and more preferably 1.0 or more and 1.15 or less.

When the ratio of (the average width of the microcapsules 40)/(the average height of the microcapsules 40) is controlled to the above-mentioned range, the microcapsules 40 can be defined as that they are present between the opposing substrate 11 and the substrate 12 in the state of maintaining the spherical shapes at high sphericity. By arranging the microcapsules 40 maintaining the spherical shapes having high sphericity in the microcapsule-containing layer 400 in such a manner that the microcapsules 40 are in contact with adjacent microcapsules 40 in the lateral direction and are not stacked in the thickness direction, the electrophoretic display device 20 having the microcapsule-containing layer 400 exhibit high contrast.

In the microcapsules 40, the capsule bodies (shells) 401 having therein the electrophoretic dispersion 10 containing the electrophoretic particles 5 may have any structure having a strength that allows the microcapsules 40 to maintain the spherical shapes between the substrates 11 and 12. In this embodiment, as shown in FIG. 1, the capsule bodies (shells) 401 are each composed of a first capsule layer (first layer) 402 and a second capsule layer (second layer) 403 disposed on the outside of the first capsule layer 402. By forming the capsule body 401 composed of two layers: the spherical shell-shaped first capsule layer 402 and the second capsule layer 403 covering the outside of the first capsule layer 402, the characteristics of these two layers can be synergistically provided to the capsule body 401.

Specifically, when the capsule body 401 is composed of two layers: the first capsule layer 402 and the second capsule layer 403, the second capsule layer 403 preferably has elasticity higher than that of the first capsule layer 402.

By doing so, the second capsule layer 403 is superior in elasticity to the first capsule layer 402, and the first capsule layer 402 is superior in hardness to the second capsule layer 403.

Therefore, the first capsule layer 402 can exhibit a function as a holding layer holding (maintaining) the shape of the capsule body 401 (microcapsule 40). In this holding layer having high hardness, since the density of the layer is high, the electrophoretic dispersion 10 hardly infiltrates thereinto. Consequently, the first capsule layer 402 can also exhibit a function of increasing the bleed resistance of the microcapsule. Furthermore, when the holding layer is made of a material having high hydrophilicity, hydrophobic/hydrophilic effect can be obtained between the first capsule layer 402 and the liquid-phase dispersion medium 6 having high hydrophobicity. Therefore, the bleed resistance of the microcapsule can be increased also from this viewpoint.

The second capsule layer 403 can exhibit a function as an absorbing layer absorbing deformation of the capsule body 401 (microcapsule 40) when a pressure is applied between the substrates 11 and 12.

The performances of the holding layer and the absorbing layer, that is, the elasticity of the second capsule layer 403 and the hardness of the first capsule layer 402 can be evaluated by various indices such as Young's modulus, tensile elastic modulus, bending strength, bending elastic modulus, compressive strength, and compressive elastic modulus. In particular, evaluation using at least one of Young's modulus and tensile elongation, which can evaluate the difference in elasticity of each layer, is preferred. These indices can be measured with a relatively simple apparatus and can surely evaluate the performances of the holding layer and the absorbing layer.

The Young's modulus shows the amount of distortion due to stress, and the larger the value, the lower the degree of deformation due to external force, that is, harder. The Young's modulus can be measured under conditions in accordance with ISO 527-2.

The tensile elongation shows the degree of elongation at breakage, and the larger the value, the higher the toughness and the higher the elasticity. The tensile elongation can be measured under conditions in accordance with ISO 527-2.

Specifically, in order to provide the function as a holding layer to the first capsule layer 402, the Young's modulus is preferably about from $5 \times 10^4$ to $15 \times 10^4$ $kg/cm^2$ and more preferably about from $8 \times 10^4$ to $11 \times 10^4$ $kg/cm^2$. The tensile elongation is preferably about from 0.1 to 1% and more preferably about from 0.5 to 0.9%.

In order to provide the function as an absorbing layer to the second capsule layer 403, the Young's modulus is preferably about from $1\times10^3$ to $4\times10^4$ kg/cm$^2$ and more preferably about from $1\times10^4$ to $2\times10^4$ kg/cm$^2$. The tensile elongation is preferably about from 2 to 10% and more preferably about from 3 to 6%.

In view of the above, the constituent materials of the first capsule layer 402 and the second capsule layer 403 are respectively selected.

Examples of the constituent material of the first capsule layer (holding layer) 402 include thermosetting resins such as amino resins, e.g., melamine resins and urea resins, epoxy resins, and phenol resins; and thermoplastic resins such as acrylic resins, urethane resins, and olefin resins. These may be used alone or in combination of two or more. In particular, the first capsule layer 402 is preferably constituted of a main material being a melamine resin. Since the melamine resin forms a three-dimensional net structure, the first capsule layer 402 formed of this resin has excellent hardness (high degree of elasticity). As a result, the first capsule layer 402 suitably exhibits the function as a holding layer, resulting in improvements in strength and bleed resistance of the capsule body 401 to surely form the microcapsule 40 having the above-described spherical shape.

The resin constituting the first capsule layer 402 may be provided with a cross-linking (three-dimensional cross-linking) structure using a cross-linking agent. By doing so, the strength and the bleed resistance of the capsule body 401 can be further increased. As a result, the microcapsule 40 is further certainly prevented or inhibited from being deformed to a non-spherical shape.

Examples of the constituent material of the second capsule layer (absorbing layer) 403 include epoxy resins, materials containing rubber such as gum arabic, composite materials of gum arabic and gelatin, various resin materials such as urethane resins, polycarbonate resins, polyamide resins, and polyether resins. These may be used alone or in combination of two or more. In particular, the second capsule layer 403 is preferably constituted of a main material being an epoxy resin. By doing so, the second capsule layer 403 can have the above-described degree of elasticity to show both suitable hardness and suitable elasticity.

Furthermore, the first capsule layer 402 and the second capsule layer 403 are preferably chemically bonded to each other at their interface. With this, detachment between the first capsule layer 402 and the second capsule layer 403 can be surely prevented even when a pressure is applied between the circuit board 22 and the electrophoretic display sheet 21. As a result, the strength and the bleed resistance of the capsule body 401 are further increased, which further certainly prevents the microcapsule 40 from being crushed even when impact or pressing is applied to the microcapsules 40 during the use or storage as a display device.

For example, in order to chemically bond the first capsule layer 402 and the second capsule layer 403 constituted of main materials being a melamine resin and an epoxy resin, respectively, being a compound having a mercapto group and a carboxyl group and/or a sulfo group is added to a shell material dispersion liquid in the step of forming the first capsule layer 402 described below to introduce mercapto groups to the first capsule layer 402, and then the second capsule layer 403 constituted of the epoxy resin material is formed.

The thickness of the capsule body 401 (in this embodiment, the sum of the thickness d1 of the first capsule layer 402 and the thickness d2 of the second capsule layer 403) is not particularly limited, but is preferably 0.1 µm or more and 5 µm or less, more preferably 0.1 µm or more and 4 µm or less, and most preferably 0.1 µm or more and 3 µm or less, in its wet state. If the thickness of the capsule body 401 is small, the capsule strength may be insufficient in some combinations of constituent materials of the first capsule layer 402 and the second capsule layer 403. Conversely, if the thickness of the capsule body 401 is large, the transparency may be decreased to cause a reduction in contrast of the electrophoretic display device in some combinations of constituent materials of the first capsule layer 402 and the second capsule layer 403.

The thickness d1 of the first capsule layer 402 and the thickness d2 of the second capsule layer 403 preferably satisfy a relationship where the ratio d1/d2 is about from 1/5 to 1, more preferably about 1/3 to 1/2. By satisfying the relationship, the characteristics of both the first capsule layer 402 and the second capsule layer 403 can be surely provided to the capsule body 401.

In this embodiment, the capsule body 401 has a two-layer structure composed of the first capsule layer 402 and the second capsule layer 403, but is not limited to the two-layer structure and may have a structure of a single layer or a multilayer of three or more layers.

The volume average particle diameter of the capsule bodies 401 is preferably 25 µm or more and 60 µm or less and more preferably 30 µm or more and 50 µm or less. By controlling the particle diameter of the capsule bodies 401 in this range, the microcapsule-containing layer 400 can be formed with high dimensional accuracy.

If the particle diameter of the capsule bodies 401 is smaller than the above-mentioned lower limit, both surface sides of the microcapsule-containing layer 400 are filled with the microcapsules 40, which may decrease the display contrast.

Conversely, if the particle diameter of the capsule bodies 401 is larger than the above-mentioned upper limit, gaps among the microcapsules 40 become large, which may decrease the display contrast.

The microcapsules 40 preferably have an approximately uniform (the same) size (particle diameter). Specifically, the coefficient of variation (CV value) of the particle diameters is preferably 15% or less and preferably 10% or less. By doing so, since the microcapsules 40 can be uniformly arranged, occurrence of display unevenness in the electrophoretic display device 20 can be prevented or inhibited, and therefore further excellent display performance can be achieved.

In the electrophoretic dispersion 10 sealed in the capsule body 401, at least one type of electrophoretic particles 5 (in this embodiment, two types of particles: colored particles 5b and white particles 5a) are dispersed (suspended) in a liquid-phase dispersion medium 6.

The dispersion of the electrophoretic particles 5 in the liquid-phase dispersion medium 6 can be performed by, for example, paint shaking, ball milling, media milling, ultrasonic dispersion, stirring dispersion, or a combination of two or more thereof.

As the liquid-phase dispersion medium 6, a medium hardly dissolving the capsule bodies 401 and having relatively high electric insulation is properly used.

Examples of the liquid-phase dispersion medium 6 include various types of water (for example, distilled water and pure water), alcohols such as methanol, cellosolves such as methyl cellosolve, esters such as methyl acetate, ketones such as acetone, aliphatic hydrocarbons (liquid paraffin) such as pentane, alicyclic hydrocarbons such as cyclohexane, aromatic hydrocarbons such as benzene, halogenated hydrocarbons such as methylene chloride, aromatic heterocycles such as pyridine, nitriles such as acetonitrile, amides such as N,N-dimethyl formamide, carboxylates, and other various types of oils. These may be used alone or as a mixture.

In particular, an aliphatic hydrocarbon (liquid paraffin) or silicone oil is preferred as the main component of the liquid-phase dispersion medium 6. The liquid-phase dispersion medium 6 having the liquid paraffin or the silicone oil as the main component highly prevents aggregation of the electrophoretic particles 5 and has low affinity to (hardly dissolves) the constituent material of the capsule bodies 401 and is therefore preferred. With this, the display performance of the electrophoretic display device 20 can be surely prevented or inhibited from being deteriorated with elapse of time. In addition, since the liquid paraffin and the silicone oil do not have unsaturated bonds, they are excellent in weather resistance and high in safety and are preferred also from such viewpoints.

The liquid-phase dispersion medium 6 (electrophoretic dispersion liquid 10) may further contain various additives, according to need, for example, an electrolyte, a surfactant (anionic or cationic surfactant) such as an alkenyl succinate, a metallic soap, a resin material, a rubber material, an oil, varnish, a charge control agent composed of particles of compound or the like, a dispersant such as a silane coupling agent, a lubricant agent, or a stabilizer.

Furthermore, the liquid-phase dispersion medium 6 may be colored, according to need, by dissolving various types of dyes such as an anthraquinone dye, an azo dye, or an indigoid dye in the liquid-phase dispersion medium 6.

The electrophoretic particles 5 have an electric charge and can be electrophoresed in the liquid-phase dispersion medium 6 by being applied with an electric field.

The electrophoretic particles 5 are not particularly limited as long as they have an electric charge, but are preferably at least one selected from pigment particles, resin particles, and composite particles thereof. These particles have advantages that they can be easily produced and that control of the charge is relatively easy.

Examples of the pigment constituting the pigment particles include black pigments such as aniline black, carbon black, and titanium black, white pigments such as titanium oxide and antimony oxide, azo pigments such as monoazo, yellow pigments such as isoindolinone and chrome yellow, red pigments such as quinacridone red and chrome vermilion, blue pigments such as phthalocyanine blue and indanthrene blue, and green pigments such as phthalocyanine green. These may be used alone or in combination of two or more.

Examples of the resin material constituting the resin particles include acrylic resins, urethane resins, urea resins, epoxy resins, polystyrenes, and polyesters. These may be used alone or in combination of two or more.

Examples of the composite particles include pigment particles having surfaces covered with a resin material or another pigment, resin particles having surfaces covered with a pigment, and particles made of a mixture of a pigment and a resin material at an arbitrary composition ratio.

Examples of the pigment particles having surfaces covered with another pigment include titanium oxide particles having surfaces covered with silicon oxide or aluminum oxide. These particles are suitably used as the white particles 5a.

The carbon black particles or the particles having covered surfaces are suitably used as the colored particles (black particles) 5b.

The shape of the electrophoretic particles 5 is not particularly limited, but is preferably spherical.

The electrophoretic particles 5 are preferred to have a smaller size in light of dispersibility in the liquid-phase dispersion medium 6. Specifically, the average particle diameter is preferably about from 10 to 500 nm and more preferably about from 20 to 300 nm. By controlling the average particle diameter of the electrophoretic particles 5 to this range, aggregation and sedimentation of the electrophoretic particles 5 in the liquid-phase dispersion medium 6 can be surely prevented, and thereby the electrophoretic particles 5 can be suitably dispersed in the liquid-phase dispersion medium 6. As a result, deterioration in display quality of the electrophoretic display device 20 can be suitably prevented.

When two different types of particles are used as in this embodiment, it is preferable that the two types particles have different average particle diameters, in particular, that the average particle diameter of the white particles 5a be larger than that of the colored particles 5b. By doing so, the display contrast of the electrophoretic display device 20 can be further improved, and the retention characteristic can be improved.

Specifically, the average particle diameter of the colored particles 5b is preferably about from 20 to 100 nm, and the average particle diameter of the white particles 5a is preferably about from 150 to 300 nm.

In addition, the specific gravity of the electrophoretic particles 5 is preferably adjusted to be approximately equal to that of the liquid-phase dispersion medium 6. By doing so, the positions of the electrophoretic particles 5 in the liquid-phase dispersion medium 6 can be maintained for a long time even after stoppage of the application of a voltage between the electrodes 3 and 4. That is, information displayed on the electrophoretic display device 20 can be retained for a long time.

The binder 41 is provided for the purposes of, for example, bonding the opposing substrate 11 and substrate 12, fixing the microcapsules 40 between the opposing substrate 11 and the substrate 12, fixing the microcapsules 40, and ensuring the insulation between the first electrodes 3 and the second electrode 4. By doing so, the durability and the reliability of the electrophoretic display device 20 can be improved.

The binder 41 is preferably a resin material having high affinity (adhesion) to the opposing substrate 11, the second electrode 4, and the capsule bodies 401 (microcapsules 40) and also being excellent in electric insulation (resin material that is electrically insulative or allows only a very small electric current to flow).

Examples of the binder 41 include synthetic resin binders such as (meth)acrylic resins, (meth)acrylic urethane resins, polyvinyl chloride resins, polyvinylidene chloride resins, melamine resins, urethane resins, styrene resins, alkyd resins, phenol resins, epoxy resins, polyester resins, polyvinyl alcohol resins, (meth)acrylic silicone resins, alkyl polysiloxane resins, silicone resins, silicone alkyd resins, silicone urethane resins, silicone polyester resins, and polyalkylene glycol resins; synthetic or natural rubber binders such as ethylene-propylene copolymer rubbers, polybutadiene rubbers, styrene-butadiene rubbers, and acrylonitrile-butadiene rubbers; and thermoplastic or thermosetting polymer binders such as cellulose nitrate, cellulose acetate butylate, cellulose acetate, ethyl cellulose, hydroxypropylmethyl cellulose, and hydroxyethyl cellulose. These may be used alone or in combination of two or more.

In these binders, (meth)acrylic resins, polyester resins, urethane resins, and polyalkylene glycol resins can relatively favorably disperse the microcapsules 40 and are excellent in adhesion to the opposing substrate 11, the substrate 12, and the microcapsules 40 and are therefore preferred as the binder 41. The (meth)acrylic resins are particularly preferred.

Furthermore, the sealing portion 7 is provided between the substrate 12 (base 2) and the opposing substrate 11 along their edges. The second electrode 4 and the microcapsule-containing layer 400 are airtightly sealed by the sealing portion 7. By doing so, moisture is prevented from infiltrating into the electrophoretic display device 20 (electrophoretic display sheet 21), and the display performance of the electrophoretic display device 20 (electrophoretic display sheet 21) can be surely prevented from being deteriorated.

Examples of the constituent material of the sealing portion 7 include various resin materials such as thermoplastic resins, e.g., acrylic resins, urethane resins, and olefin resins; and thermosetting resins, e.g., epoxy resins, melamine resins, and phenol resins. These may be used alone or in combination of two or more.

Note that the sealing portion 7 may be provided according to need and may be omitted.

In this embodiment, the electrophoretic display sheet 21 and the circuit board 22 are joined to each other through the adhesive layer 8. By doing so, the electrophoretic display sheet 21 and the circuit board 22 can be further surely fixed.

The material of the adhesive layer 8 is not particularly limited, but, for example, (meth)acrylic resins, polyester resins, urethane resins, and polyalkylene glycol resins are excellent in adhesion to the substrate 12, the binder 41, and the microcapsules 40 and are therefore preferably used. In particular, (meth)acrylic resins are preferably used.

2. Method of Operation of Electrophoretic Display Device

The electrophoretic display device 20 is operated as follows.

The process of the action (operation) of the electrophoretic display device 20 will be described below.

FIGS. 2A and 2B are schematic diagrams illustrating the operating principle of the electrophoretic display device shown in FIG. 1. Note that the upper sides in FIGS. 2A and 2B are referred to as "upper", and the lower sides are referred to as "lower", in the following descriptions.

An electric field is formed between the first electrode 3 and the second electrode 4 of the electrophoretic display device 20 by applying a voltage between the first electrode 3 and second electrode 4. According to this electric field, the electrophoretic particles 5 (colored particles 5b and white particles 5a) are electrophoresed toward either of the electrodes.

For example, when the white particles 5a are positively charged and the colored particles (black particles) 5b are negatively charged, as shown in FIG. 2A, the white particles 5a migrate toward the second electrode 4 side and are gathered thereon by applying a positive potential to the first electrode 3. On the other hand, the colored particles 5b migrate toward the first electrode 3 side and are gathered thereon. As a result, when the electrophoretic display device 20 is viewed from the upper side (display surface side), the color of the white particles 5a, namely, a white, is observed.

Conversely, as shown in FIG. 2B, the white particles 5a migrate toward the first electrode 3 side and are gathered thereon by applying a negative potential to the first electrodes 3. On the other hand, the colored particles 5b migrate toward the second electrode 4 side and are gathered thereon. As a result, when the electrophoretic display device 20 is viewed from the upper side (display surface side), the color of the colored particles 5b, namely, a black, is observed.

In such a structure, desired information (image) is displayed on the display surface side of the electrophoretic display device 20 according to, for example, the combination of colors of the white particles 5a and the colored particles 5b and the numbers of particles gathered on the electrodes 3 and 4 sides by suitably setting the charge amounts of the electrophoretic particles 5 (white particles 5a and colored particles 5b), polar characters of the electrode 3 or 4, the potential difference between the electrodes 3 and 4, and so on.

In the electrophoretic display device 20, since the microcapsules 40 are arranged in the microcapsule-containing layer 400 in such a manner that the microcapsules 40 are in contact with adjacent microcapsules 40 in the lateral direction and are not stacked in the thickness direction, the electrophoretic display device 20 having the microcapsule-containing layer 400 can exhibit high contrast.

In the electrophoretic display device 20, the microcapsule-containing layer 400 contains the microcapsules 40 retaining spherical shapes and is thereby excellent in pressure resistance and bleed resistance. Therefore, breakage of the microcapsules 40 or leakage of the electrophoretic dispersion liquid can be prevented even if the electrophoretic display device is applied with impact or the display surface is pressed during the operation of the electrophoretic display device 20 or during the storage of the electrophoretic display device 20, and the electrophoretic display device can be operated stably for a long time.

3. Method of Producing Electrophoretic Display Device (No. 1)

The electrophoretic display device 20 can be produced as follows.

The method of producing the electrophoretic display device 20 will be described below.

FIGS. 3A to 3D, 4A and 4B, and 5A and 5B are schematic diagrams illustrating a method of producing the electrophoretic display device shown in FIG. 1. Note that the upper sides in FIGS. 3A to 3D, 4A and 4B, and 5A and 5B are referred to as "upper", and the lower sides are referred to as "lower", in the following descriptions.

The method of producing the electrophoretic display device 20 shown in FIGS. 3A to 3D, 4A and 4B, and 5A and 5B includes a microcapsule-producing step (A1) of producing microcapsules 40, a microcapsule dispersion-preparing step (A2) of preparing a microcapsule dispersion containing the microcapsules 40, a microcapsule-containing layer-forming step (A3) of forming a microcapsule-containing layer 400 containing the microcapsules 40 on the second electrode 4 side of a substrate 12, an adhesive layer-forming step (A4) of forming an adhesive layer 8 on the first electrodes 3 side of an opposing substrate 11 having the first electrodes 3, a joining step (A5) of joining the adhesive layer 8 and the electrophoretic display sheet 21 by bringing the surface of the electrophoretic display sheet 21 on the opposite side of the substrate 12 into contact with the surface of the adhesive layer 8 on the opposite side of the first electrodes 3, and a sealing step (A6) of forming a sealing portion 7 on the edge between the base 2 and the opposing substrate 11.

Each step will be described below.

(A1) Step of Producing Microcapsule (A1-1) Formation of First Capsule Layer

First, microcapsules each composed of a first capsule layer 402 containing an electrophoretic dispersion 10 therein are prepared. Note that, hereinafter, this microcapsule is referred to as "pre-microcapsule" for convenience of explanation.

The first capsule layer 402 may be formed, for example, using the electrophoretic dispersion 10 as a core material by any microcapsulation technique.

The microcapsulation (sealing of the electrophoretic dispersion 10 in the first capsule layer 402) is not particularly limited and may be performed by, for example, interface polymerization, in-situ polymerization, phase separation (or coacervation), interface precipitation, or spray drying. The microcapsulation may be suitably selected according to the constituent material of the first capsule layer 402.

When the constituent material of the first capsule layer 402 is, for example, an amino resin such as a melamine resin or urea resin, coacervation is preferably employed. In the coacervation, droplets of the electrophoretic dispersion 10 that become a core material and an initial condensation compound obtained by a reaction of an amino resin monomer and formaldehyde are put in an aqueous medium to cause condensation of the initial condensation compound near the surfaces of the droplets of the electrophoretic dispersion 10 thereby to form amino resin layer (first capsule layer 402). Thus, the pre-microcapsules can be certainly formed.

The formation by coacervation of the first capsule layer 402 (pre-microcapsule) constituted of the amino resin will be described in detail below.

(i) Preparation of Core Material Dispersion

First, a core material dispersion where droplets of the electrophoretic dispersion 10 serving as a core material are dispersed is prepared by dispersing the electrophoretic dispersion 10 composed of electrophoretic particles 5 and a liquid-phase dispersion medium 6 in an aqueous medium.

As the aqueous medium, water or a solvent mixture of water and a hydrophilic organic solvent can be used.

Examples of the hydrophilic organic solvent contained in the solvent mixture include alcohols such as methanol, ethanol, n-propyl alcohol, isopropyl alcohol, and allyl alcohol; glycols such as ethylene glycol, propylene glycol, butylene glycol, hexylene glycol, pentane dial, hexane dial, heptane diol, and dipropylene glycol; ketones such as acetone, methyl ethyl ketone, methyl propyl ketone, and methyl isobutyl ketone; esters such as methyl formate, ethyl formate, methyl acetate, and methyl acetoacetate; and ethers such as diethylene glycol monomethyl ether, diethylene glycol monoethyl ether, diethylene glycol dimethyl ether, ethylene glycol monomethyl ether, ethylene glycol monoethyl ether, and dipropylene glycol monomethyl ether. These may be used alone or in combination of two or more.

When a solvent mixture of water and a hydrophilic organic solvent is used, the blending amount of water in the solvent mixture is preferably 70 mass % or more and 95 mass % or less, more preferably 75 mass % or more and 95 mass % or less, and most preferably 80 mass % or more and 95 mass % or less.

The aqueous medium may further contain another solvent, in addition to the water and the hydrophilic organic solvent.

Examples of the additional solvent include hexane, cyclopentane, pentane, isopentane, octane, benzene, toluene, xylene, ethylbenzene, aminylsqualene, petroleum ethers, terpene, castor oil, soybean oil, paraffin, and kerosene. These may be used alone or in combination of two or more.

The content of the additional solvent in the aqueous medium is preferably at most 30 mass %, more preferably at most 25 mass %, and most preferably at most 20 mass %.

The amount of the core material dispersed in the aqueous medium is not particularly limited, and is preferably 5 parts by mass or more and 70 parts by mass or less, more preferably 8 parts by mass or more and 65 parts by mass or less, and most preferably 10 parts by mass or more and 60 parts by mass or less, based on 100 parts by mass of the aqueous medium. If the amount of the dispersed core material is small, it takes a large amount of time to form the first capsule layer 402, or pre-microcapsules having a desired particle diameter cannot be sufficiently prepared, resulting in a broad particle size distribution of the pre-microcapsules. Thus, the productivity may be decreased. Conversely, if the amount of the dispersed core material is large, aggregation of the core material or suspension of the aqueous medium in the core material may occur to prevent formation of microcapsules.

The core material may be dispersed in the aqueous medium using a dispersing agent, according to need. Examples of the dispersing agent include water-soluble polymers such as polyvinyl alcohol (PVA), carboxymethyl cellulose (CMC), gelatin, and gum arabic; and surfactants such as anionic surfactants, cationic surfactants, amphoteric surfactants, and nonionic surfactants. These may be used alone or in combination of two or more.

The amount of the dispersing agent added to the aqueous medium is not particularly limited and is arbitrarily adjusted within the range that does not inhibit formation of the first capsule layer.

(ii) Generation of Initial Condensation Compound

The initial condensation compound is prepared by condensation of an amino resin monomer and formaldehyde.

Examples of the monomer include amino compounds such as melamine and urea compounds, e.g., urea and thiourea. These may be used alone or in combination of two or more according to the constituent material of a desired capsule layer.

For example, an initial composite compound giving a melamine resin is obtained by using melamine as the monomer, and an initial composite compound giving a urea resin is obtained by using a urea compound. By using a combination of melamine and a urea compound, an initial composite compound giving a resin mixture of a melamine resin and a urea resin is obtained.

The reaction between a monomer and formaldehyde is usually performed using water as a solvent. Specifically, the monomer is added to an aqueous formaldehyde solution, or an aqueous formaldehyde solution is added to the monomer, and the resulting mixture is mixed. By doing so, the monomer and the formaldehyde are condensated to give an aqueous solution of an initial condensation compound. This condensation is preferably performed under stirring with, for example, a stirring device.

The molar ratio of the monomer to the formaldehyde (monomer/formaldehyde) used in the condensation is not particularly limited, but is preferably 1/10 or more and 1/0.5 or less, more preferably 1/8 or more and 1/1 or less, and most preferably 1/6 or more and 1/1 or less. If the molar ratio of monomer/formaldehyde is small, the amount of unreacted formaldehyde is increased, which may reduce the reaction efficiency. Conversely, if the molar ratio of monomer/formaldehyde is large, the amount of unreacted monomer is increased, which may reduce the reaction efficiency.

In addition, the initial concentrations (concentrations at the time of feeding) of the monomer and the formaldehyde in this reaction system are preferably as high as possible within the range that does not affect the reaction.

The reaction temperature for the condensation is not particularly limited, but is preferably 55 or more and 85° C. or less, more preferably 60 or more and 80° C. or less, and most preferably 65 or more and 75° C. or less.

The condensation is terminated by, for example, cooling the reaction solution to an ordinary temperature (for example, 25° C. or more and 30° C. or less) at the time the reaction endpoint has been recognized.

The reaction time is not particularly limited and can be properly determined according to the feeding amount.

(iii) Formation of First Capsule Layer

Then, the initial condensation compound obtained in the step (ii) is gradually added to the core material dispersion obtained in the step (i). By doing so, the initial condensation compound adsorbs to the surfaces of the droplets of the electrophoretic dispersion 10 and is condensed. As a result, a resin layer (first capsule layer 402) is formed on the surface of the droplet of the electrophoretic dispersion 10 to give a pre-microcapsule containing the electrophoretic dispersion 10 therein.

The amount of the initial condensation compound added to the core material dispersion is not particularly limited, but is preferably 0.5 parts by mass or more and 10 parts by mass or less, more preferably 0.5 parts by mass or more and 5 parts by mass or less, and most preferably 0.5 parts by mass or more and 3 parts by mass or less, based on 1 part by mass of the core material. The thickness of the first capsule layer 402 can be easily controlled by controlling the amount of the added initial condensation compound. If the amount of the added initial condensation compound is small, it is difficult to obtain a first capsule layer 402 having a sufficient thickness, which may makes the pressure resistance and the bleed resistance of the obtaining microcapsules 40 insufficient, depending on the type of the amino compound used. If the amount of the added initial condensation compound is large, the thickness of the obtained first capsule layer 402 becomes large, which may make the flexibility and the transparency of the first capsule layer 402 insufficient.

The initial condensation compound may be added to the core material dispersion by any method without particular limitation and may be added all at once or gradually (continuous addition and/or intermittent addition). The addition of the initial condensation compound is preferably performed under stirring using, for example, a stirring device.

Furthermore, it is preferable to introduce mercapto (thiol) groups to the first capsule layer 402. By doing so, the first capsule layer 402 and the second capsule layer 403 described below are chemically bonded via the mercapto groups at their interface. Therefore, the adhesion between the first capsule layer 402 and the second capsule layer 403 is increased.

The mercapto groups can be introduced to the first capsule layer 402 by, for example, forming the first capsule layer 402 in the core material dispersion containing a compound (thiol compound) having a mercapto group (—SH group), a carboxyl group (—COOH group) capable of reacting with the amino group of the initial condensation compound and/or a sulfo group (—SO$_3$H group).

Specifically, examples of the thiol compound include cysteine (2-amino-3-mercaptopropionic acid), mercaptoacetic acid, mercaptopropionic acid, mercaptobenzoic acid, mercaptosuccinic acid, mercaptoethanesulfonic acid, and mercaptopropanesulfonic acid, and alkali metal salts, alkaline-earth metal salts; and ammonium salts thereof. These may be used alone or in combination of two or more. In particular, L-cysteine is easily-obtainable and is suitably used.

The amount of the thiol compound added to the core material dispersion is not particularly limited, but is preferably 1 part by mass or more and 20 parts by mass or less, more preferably 1 part by mass or more and 10 parts by mass or less, and most preferably 1 part by mass or more and 5 parts by mass or less, based on 100 parts by mass of the initial condensation compound. If the amount of the added thiol compound is small, the amount of the mercapto groups introduced to the first capsule layer 402 is small, and the effect of the mercapto group introduction, that is, the effect of tightly bonding the second capsule layer 403 to the first capsule layer 402, cannot be sufficiently obtained. If the amount of the added thiol compound is large, the strength of the formed first capsule layer 402 is low, which may make the pressure resistance and the bleed resistant insufficient.

The thiol compound may be added to the core material dispersion by any method without particular limitation. For example, it may be preferably performed by adding the initial condensation compound to the core material dispersion, sufficiently stirring the mixture, and then adding an aqueous solution of the thiol compound thereto.

The reaction temperature for forming the first capsule layer 402 is not particularly limited, but is preferably 25° C. or more and 80° C. or less, more preferably 30° C. or more and 70° C. or less, and most preferably 35° C. or more and 60° C. or less. The reaction time is not particularly limited and can be suitably determined according to the feeding amount.

Furthermore, after the condensation reaction, an aging step where the reaction solution is left at a predetermined temperature may be performed. The aging temperature is not particularly limited, but is preferably the same as or slightly higher than the reaction temperature for condensation. The aging time is not particularly limited, but is preferably 0.5 hour or more and 5 hours or less and more preferably 1 hour or more and 3 hours or less.

The thus-obtained pre-microcapsules may be subjected to the subsequent step in the state of being dispersed in an aqueous medium for the purposes of sorting and washing or may be subjected to the subsequent step after being separated from an aqueous medium by, for example, vacuum filtration or gravity filtration. From the viewpoint of surely preventing the first capsule layer 402 from being damaged or broken by the impact or pressure in filtration, the pre-microcapsules are preferably subjected to the subsequent step without being separated from the aqueous medium.

(iv) Sorting and Washing of Pre-Microcapsules

Then, the pre-microcapsules are sorted and washed.

The method for sorting the pre-microcapsules is not particularly limited. Examples thereof include sieve-type, filter-type, centrifugal sedimentation-type, and gravity sedimentation-type sorting procedures. Among them, the sieve-type sorting is preferred for collecting the pre-microcapsules having relatively large particle diameters.

The washing of the pre-microcapsules is not particularly limited. Examples thereof include centrifugal sedimentation-type and gravity sedimentation-type washing procedures. Among them, the gravity sedimentation-type washing is preferred for washing the pre-microcapsules having relatively large particle diameters from the viewpoint of preventing the pre-microcapsules from being damaged or broken. The washing may be performed once or multiple times.

(A1-2) Formation of Second Capsule Layer

Then, a second capsule layer 403 is formed on the external surface of the pre-microcapsule (first capsule layer 402) obtained in the step (A1-1) to obtain the microcapsule 40 containing the electrophoretic dispersion 10 therein.

The second capsule layer 403 can be formed by, for example, gradually adding a resin prepolymer to a capsule dispersion where the pre-microcapsules are dispersed in an aqueous medium and polymerizing the prepolymer adsorbed on the surfaces of the pre-microcapsules. By doing so, the second capsule layer 403 is formed on the surface of the pre-microcapsule to give the microcapsule 40 containing the electrophoretic dispersion 10 therein.

Examples of the aqueous medium for dispersing the pre-microcapsule include the same aqueous media as those for dispersing the electrophoretic dispersion in the step (A1-1).

When the pre-microcapsules obtained in the step (A1-1) are in the state of being dispersed in an aqueous medium, the pre-microcapsules may be directly used as the capsule dispersion or may be concentrated or diluted according to need and then be used as the capsule dispersion.

The prepolymer is a material that gives a resin by polymerization. Examples of the prepolymer include resin monomers and oligomers and mixtures thereof.

Specifically, the prepolymer is suitably selected according to the constituent material of the second capsule layer 403. For example, when the second capsule layer 403 is constituted of an epoxy resin, a compound having an epoxy group (epoxy compound) is used.

The second capsule layer 403 constituted of an epoxy resin can certainly have excellent elasticity compared to the first capsule layer 402 constituted of an amino resin. When the first capsule layer 402 has mercapto groups, the second capsule layer 403 is chemically bonded to the surface of the first capsule layer 402 via the mercapto groups. As a result, microcapsules 40 excellent in strength can be obtained.

The epoxy compound is not particularly limited. An epoxy compound having at least one epoxy group per molecule can be used, and, in particular, a water-soluble epoxy compound having two or more epoxy groups per molecule is preferably used.

Specific examples of the epoxy compound include sorbitol polyglycidyl ether, sorbitan polyglycidyl ether, and polyglycerol polyglycidyl ether. These may be used alone or in combination of two or more.

The mass average molecular weight of the epoxy compound is preferably about from 300 to 100000, more preferably about from 300 to 75000, and most preferably about from 300 to 50000. If the mass average molecular weight of the epoxy compound is small, the strength of the second capsule layer 403 may be insufficient depending on the type of the epoxy compound used. Conversely, if the mass average molecular weight of the epoxy compound is large, the viscosity of the reaction system becomes high, which may cause a difficulty in stirring.

The amount of the epoxy compound added to the capsule dispersion is not particularly limited, but is preferably 0.5 part by mass or more and 10 parts by mass or less, more preferably 0.5 part by mass or more and 5 parts by mass or less, and most preferably 0.5 part by mass or more and 3 parts by mass or less, based on 1 part by mass of the pre-microcapsule. By adjusting the amount of the added epoxy compound, the thickness of the second capsule layer 403 can be easily controlled. If the amount of the added epoxy compound is small, it is difficult to form the second capsule layer 403 having a sufficient thickness, and the pressure resistance of the obtaining microcapsules 40 may be insufficient. If the amount of the added epoxy compound is large, the thickness of the obtained second capsule layer 403 becomes large, which may make the flexibility and the transparency of the second capsule layer 403 insufficient.

The method of adding the epoxy compound to the capsule dispersion is not particularly limited. For example, it is preferable to add an aqueous solution of the epoxy compound to the capsule dispersion. The addition may be all at once or gradual (continuous addition and/or intermittent addition). The addition of the epoxy compound is preferably performed under stirring using, for example, a stirring device.

Furthermore, the capsule dispersion preferably contains a cross-linking agent. By doing so, the second capsule layer 403 can have a cross-linking structure. The second capsule layer 403 having a cross-linking structure is high in strength, which makes the strength of the entire capsule body 401 high. Therefore, in the subsequent steps of separating and washing the microcapsules 40, the capsule bodies 401 can be effectively prevented from being damaged or broken.

Examples of the cross-linking agent when the prepolymer is an epoxy compound include sodium diethyldithiocarbamate (including its hydrate), diethylammonium diethyldithiocarbamate (including its hydrate), dithiooxalic acid, and dithiocarbonic acid. These may be used alone or in combination of two or more.

The amount of the cross-linking agent added to the capsule dispersion is not particularly limited, but is preferably 1 part by mass or more and 100 parts by mass or less, more preferably 5 parts by mass or more and 90 parts by mass or less, and most preferably 10 parts by mass or more and 80 parts by mass or less, based on 100 parts by mass of the epoxy compound. If the amount of the added cross-linking agent is small, the effect of increasing the strength of the second capsule layer 403 is insufficient. If the amount of the added cross-linking agent is large, the cross-linking agent may excessively react with the epoxy group of the epoxy compound to decrease the flexibility of the second capsule layer 403.

The cross-linking agent may be added to the capsule dispersion when the epoxy compound is added or may be added before or after the addition of the epoxy compound. For example, it is preferable to add an aqueous solution of the epoxy compound to the capsule dispersion, and, after a small amount of time, dropwise add an aqueous solution of the cross-linking agent thereto with stirring.

The reaction temperature for forming the second capsule layer 403 is not particularly limited, but is preferably 25° C. or more and 80° C. or less, more preferably 30° C. or more and 70° C. or less, and most preferably 35° C. or more and 60° C. or less. The reaction time is not particularly limited and can be suitably determined according to the feeding amount.

Furthermore, after the formation of the second capsule layer 403, an aging step where the reaction solution is left at a predetermined temperature may be performed. The aging temperature is not particularly limited. For example, the aging temperature is preferably the same as or slightly higher than the temperature for forming the second capsule layer 403. The aging time is not particularly limited, but is preferably 0.5 hour or more and 5 hours or less and more preferably 1 hour or more and 3 hours or less.

The thus-obtained microcapsules 40 may be subjected to the subsequent step in the state of being dispersed in an aqueous medium or may be subjected to the subsequent step after being separated from an aqueous medium by, for example, vacuum filtration or gravity filtration. If the microcapsules 40 are dried, the solvent of the electrophoretic dispersion may leach from the capsule bodies 401 and evaporate. Therefore, it is preferable that the microcapsules 40 be subjected to the subsequent step without being separated from the aqueous medium.

The obtained microcapsules 40 are preferably sorted and washed. By doing so, the microcapsules 40 having a narrow particle size distribution and small amounts of impurities can be obtained.

The sorting and washing may be performed by, for example, methods similar to those in the step (A1-1).

(A2) Step of Preparing Microcapsule Dispersion

Then, a binder 41 is prepared, and the binder 41 is mixed with the microcapsules 40 produced in the step (A1) to prepare a microcapsule dispersion.

The content of the microcapsules 40 in the microcapsule dispersion is preferably about from 50 to 95 wt % and more preferably about from 70 to 90 wt %. The content of the microcapsules 40 adjusted in this range is very advantageous for arranging the microcapsules 40 by moving (rearranging) the microcapsules 40 in the microcapsule-containing layer 400 in the next step (A3) so that the microcapsules 40 are in contact with one another in the lateral direction and do not overlap in the thickness direction (to form a single layer).

In addition, from the viewpoint of arranging the microcapsules 40 by moving (rearranging) the microcapsules 40 in the next step (A3), the binder 41 to be prepared is selected from the above-mentioned binders having a glass transition temperature in the range of from −50 to 10° C. The lower limit is preferably −45° C. and most preferably −40° C., and the upper limit is preferably 5° C. and more preferably 0° C. If the glass transition temperature of the binder 41 is lower than −50° C., the adhesive between the adhesive layer 8 and the substrate 12 may be decreased. Conversely, if the glass transition temperature of the binder 41 is higher than 10° C., the microcapsules 40 hardly migrate in the microcapsule-containing layer 400 in the next step (A3), as a result, the microcapsules 40 may overlap in the thickness direction to reduce the contrast of the electrophoretic display device 20.

The binder 41 having such a glass transition temperature is constituted of a material having high flexibility, rather than a material having relatively high rigidity.

Among the above-mentioned binders, specific examples of the binder 41 having high flexibility are polyalkylene glycol resins and (meth)acrylic resins having a side chain of an alkyl group containing two or more carbon atoms. These may be used alone or in combination of two or more.

Among them, those having a glycol chain, that is, polyalkylene glycol resins, are preferably used as the binder having high flexibility. In particular, a polyalkylene glycol resin having a weight average molecular weight of 200 or more and 100000 or less is preferably used. The polyalkylene glycol resin having such a weight average molecular weight is excellent in adhesive with the adhesive layer 8 and the substrate 12 and allows the microcapsules 40 to easily migrate in the microcapsule-containing layer 400 in the next step (A3). As a result, overlapping of the microcapsules 40 in the thickness direction can be surely prevented.

(A3) Step of Forming Microcapsule-Containing Layer 400

Figure 3A:
FIGS. 3A to 3D are schematic diagrams illustrating a method of producing the electrophoretic display device shown in FIG. 1.
Figure 3B:
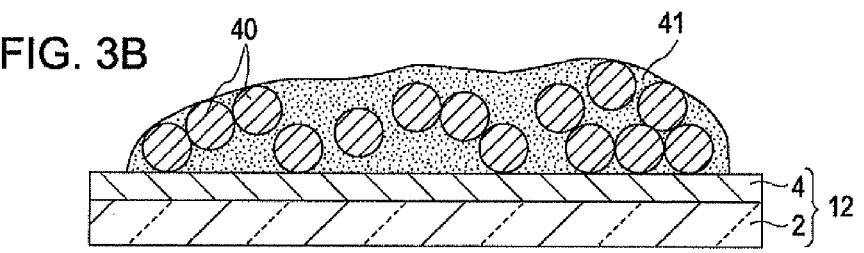

First, as shown in FIG. 3A, a substrate 12 having a second electrode 4 is prepared. Then, as shown in FIG. 3B, the microcapsule dispersion prepared in the step (A2) is supplied onto the surface of the substrate 12 on the second electrode 4 side.

The method of supplying the microcapsule dispersion onto the surface of the substrate 12 on the second electrode 4 side is not particularly limited and may be, for example, coating such as spin coating, dip coating, spray coating, die coating, or comma coating.

Then, according to need, the microcapsule dispersion is leveled so that the thickness (amount) of the microcapsule dispersion is uniform at every portion on the second electrode 4 of the substrate 12.

Figure 3C:
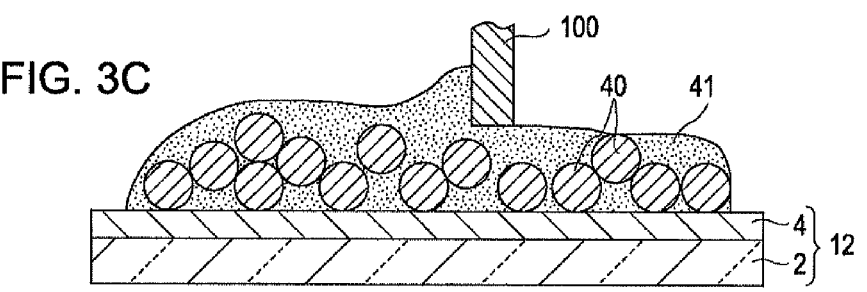
Figure 3D:
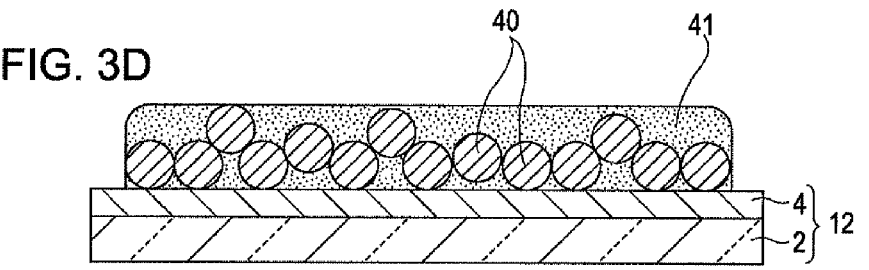

This can be performed by, for example, as shown in FIG. 3C, sweeping the microcapsules 40 with a squeegee (plate-like jig) 100 passing on the second electrode 4 of the substrate 12. By doing so, as shown in FIG. 3D, the thickness of the microcapsule dispersion becomes uniform at every portion of the substrate 12.

Figure 4A:
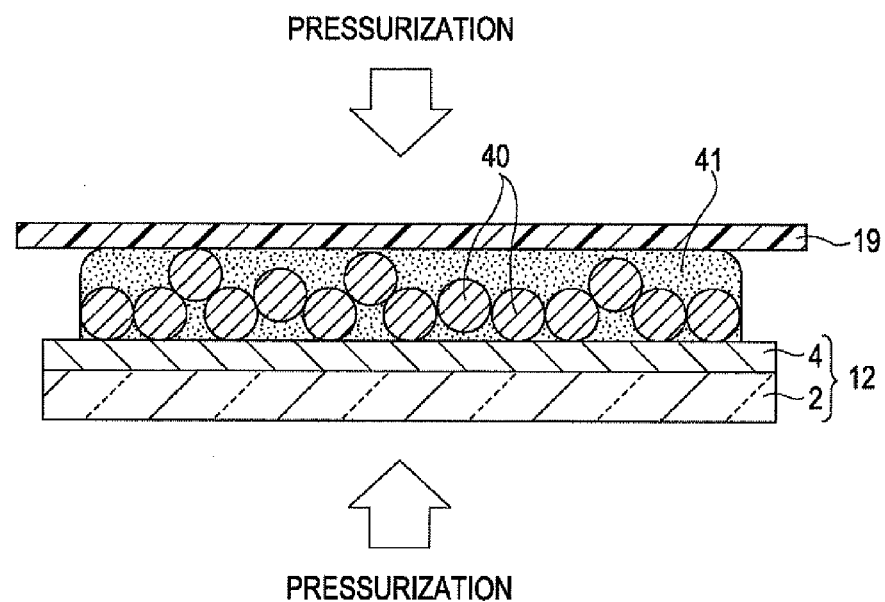
FIGS. 4A and 4B are schematic diagrams illustrating the method of producing the electrophoretic display device shown in FIG. 1.

Then, a plate-like pressing substrate 19 is prepared and is disposed on the microcapsule dispersion having the uniformized thickness. Then, as shown in FIG. 4A, the microcapsule dispersion is pressurized in the direction that the substrate 12 and the pressing substrate 19 come closer to each other, that is, in the thickness direction of the substrates 12 and 19. By doing so, in the microcapsule dispersion pressurized in the thickness direction of the substrates 12 and 19, the microcapsules 40 being stacked in the microcapsule dispersion migrate so that the arrangement density of the microcapsules 40 in the microcapsule dispersion is uniformized. As a result, the microcapsules 40 are arranged so as to be in contact with one another in the lateral direction of the substrates 12 and 19 and to form a single layer without overlapping in the thickness direction.

That is, a microcapsule-containing layer 400 is formed in such a manner that the microcapsules 40 are arranged so as to be in contact with one another in the lateral direction of the substrates 12 and 19 and to form a single layer without overlapping in the thickness direction.

As in this embodiment, by pressurizing the microcapsule dispersion in the thickness direction of the substrates 12 and 19 using the plate-like pressing substrate 19, every portion of the microcapsule dispersion supplied on the second electrode 4 of the substrate 12 can be uniformly pressurized. Therefore, the microcapsules 40 can be certainly arranged so as to be in contact with one another in the lateral direction of the substrates 12 and 19 and to form a single layer without overlapping in the thickness direction at every portion of the microcapsule dispersion.

The pressing substrate (releasing sheet) 19 is not particularly limited, but is preferably a substrate that can be easily detached from the microcapsule-containing layer 400 after pressurizing in the thickness direction of the substrates 12 and 19. Specifically, for example, a substrate where a release agent layer is formed on a surface of a base material (backing material) is preferably used.

Examples of the base material include plastic films, craft paper, polyethylene-laminated paper, polypropylene-laminated paper, and nonwoven fabrics that are constituted of a main material being at least one selected from polyethylene terephthalate, high-pressure low-density polyethylene, high-density polyethylene, straight-chain low-density polyethylene, ethylene-vinyl acetate copolymer resins, non-oriented polypropylene, oriented polypropylene, and oriented nylon.

The thickness of the base material is preferably about from 10 to 130 μm and more preferably about from 30 to 100 μm.

The release agent layer is not particularly limited. Examples of the release agent layer include those constituted of a main material being at least one selected from silicone release agents, fluorine release agents, and modified silicone release agents.

The thickness of the release agent layer is not particularly limited and is preferably about from 0.01 to 2 μm and more preferably about from 0.1 to 1 μm.

The pressing substrate 19 having such a structure can be surely detached from the microcapsule-containing layer 400 without adhesion of a part of the microcapsule-containing layer 400 to the pressing substrate 19. Furthermore, the microcapsule dispersion positioned between the substrate 12 and the pressing substrate 19 can be uniformly pressurized.

When the pressing substrate 19 does not have the release agent layer, the pressing substrate 19 is preferably provided with asperities on the surface. That is, the surface of the pressing substrate 19 is preferably embossed. The pressing substrate 19 provided with the asperities on the surface can have a function similar to that of the release agent layer and can be easily detached from the microcapsule-containing layer 400.

The method of pressurizing the microcapsule dispersion in the thickness direction of the substrates 12 and 19 is not particularly limited and may be, for example, lamination using a sheet-fed type vacuum laminator, a metal roller-type laminator, or a rubber roller-type laminator. By employing lamination, every portion of the microcapsule dispersion supplied on the second electrode of the substrate 12 can be pressurized with a uniform pressing force.

The apparatus for the lamination is not particularly limited, but an example thereof is a roller laminator ("VA-700DFR", a product of Taisei Laminator Co., Ltd.).

The pressure applied between the substrates 12 and 19 in the thickness direction of the substrates 12 and 19 is preferably about from 0.4 to 1.5 MPa and more preferably about from 0.4 to 1.0 MPa. By applying a pressure of such an intensity between the substrate 12 and the pressing substrate 19, the microcapsules 40 contained in the microcapsule dispersion migrate in the microcapsule dispersion liquid (binder 41) while maintaining the approximately spherical shapes without being compressed (pressed) in the vertical direction and are eventually arranged in the microcapsule dispersion liquid so as to be in contact with one another in the lateral direction of the substrates 12 and 19 and to form a single layer without overlapping in the thickness direction.

The temperature of the microcapsule dispersion when it is pressurized is preferably about from 50 to 150° C. and more preferably about from 70 to 100° C. By setting the temperature within the range, the microcapsules 40 in the microcapsule dispersion liquid (binder 41) can be certainly moved by pressurizing the microcapsule dispersion in the thickness direction of the substrates 12 and 19.

Furthermore, it is preferable to apply vibration to the microcapsule dispersion while the microcapsule dispersion is pressurized in the thickness direction of the substrates 12 and 19. By doing so, the microcapsules 40 can be more uniformly distributed in the lateral direction of the substrates 12 and 19. The application of vibration is performed, preferably, by applying ultrasound to the microcapsule dispersion. The frequency of the ultrasound is preferably in the range of $1\times10^5$ Hz or more and $1\times10^8$ Hz or less and more preferably in the range of $1\times10^5$ Hz or more and $1\times10^7$ Hz or less.

Furthermore, after the pressurization of the microcapsule dispersion in the thickness direction of the substrates 12 and 19, while the state is maintained, the substrate 12 and the pressing substrate 19 are preferably shifted from each other in a lateral direction, and more preferably the substrate 12 and the pressing substrate 19 are further shifted from each other in another lateral direction perpendicular to the lateral direction. By doing so, the distribution of the microcapsules 40 in the lateral direction of the substrates 12 and 19 can be made particularly uniform.

The shifting distance in the lateral direction of the substrate 12 and the pressing substrate 19 is preferably about one revolution of the microcapsule 40, specifically, about from 100 to 200 μm and more preferably about from 120 to 150 μm. By doing so, the above-mentioned effect can be further notably exhibited.

Then, the pressing substrate 19 is detached from the pressurized microcapsule dispersion. By doing so, as shown in FIG. 4B, the microcapsule-containing layer 400 is formed on the substrate 12 in such a manner that the microcapsules 40 are arranged so as to be in contact with one another in the lateral direction of the substrate 12 and to form a single layer without overlapping in the thickness direction.

Thus, in this embodiment, the microcapsule dispersion supplied on the second electrode 4 of the substrate 12 is pressurized using the plate-like pressing substrate 19 in the state that the microcapsule dispersion is sandwiched between the substrate 12 and the pressing substrate 19, and then the pressing substrate 19 is detached from the microcapsule dispersion. Accordingly, the pressing substrate 19 that is suitably for the pressurization of the microcapsule dispersion can be arbitrarily selected.

Figure 4B:
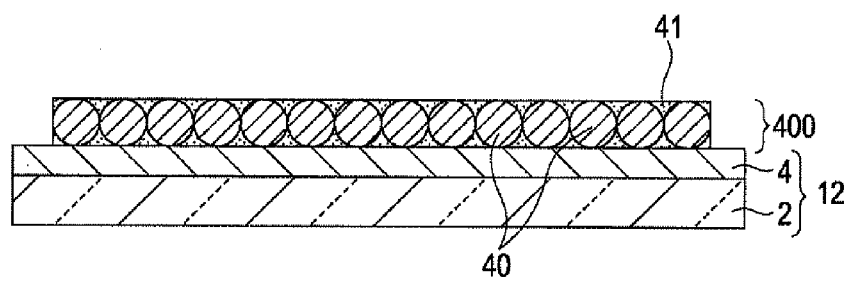

Through the above, as shown in FIG. 4B, an electrophoretic display sheet 21 where a single layer of the microcapsule-containing layer 400 is disposed on the second electrode 4 of the substrate 12 can be produced.

(A4) Step of Forming Adhesive Layer 8

Figure 5A:
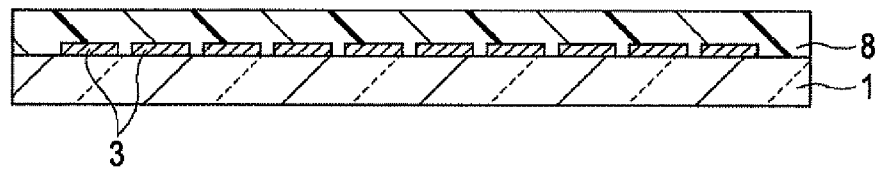
FIGS. 5A and 5B are schematic diagrams illustrating the method of producing the electrophoretic display device shown in FIG. 1.

Then, as shown in FIG. 5A, an adhesive layer 8 is formed on a separately prepared opposing substrate 11 on the first electrodes 3 side.

This can be performed by, for example, disposing the sheet-like adhesive layer 8 on the opposing substrate 11 on the first electrodes 3 side by, for example, a transfer method.

(A5) Step of Joining of Circuit Board 22

Figure 5B:
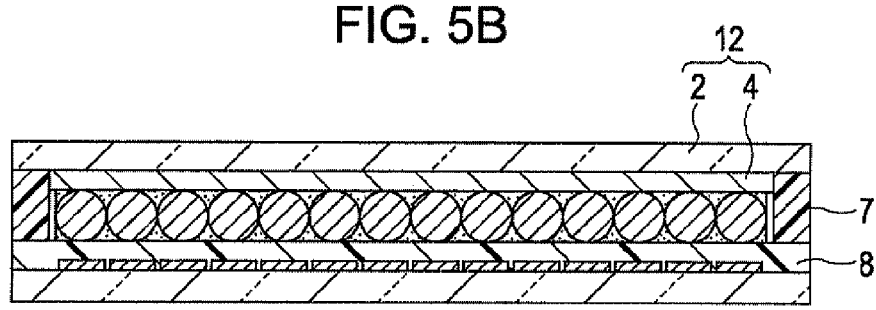

Then, as shown in FIG. 5B, the circuit board 22 provided with the adhesive layer 8 on the first electrodes 3 side and the electrophoretic display sheet 21 obtained in the step (A3) are joined via the adhesive layer 8 by joining the adhesive layer 8 on the first electrodes 3 to the electrophoretic display sheet 21 on the opposite side of the substrate 12.

(A6) Step of Sealing by Forming Sealing Portion 7

Then, a sealing portion 7 is formed along the edges of the base 2 and the opposing substrate 11.

The sealing portion 7 can be formed by supplying a material for forming the sealing portion 7 between the base 2 and the opposing substrate 11 along their edges with, for example, a dispenser and then solidifying or curing the material.

Through the above-described steps, the electrophoretic display device 20 is obtained.

4. Method of Producing Electrophoretic Display Device (No. 2)

The electrophoretic display device 20 can be produced by a method different from the above-described method as follows. The method will be described below, but the differences from the above-described method (no. 1) will be mainly described, and descriptions on similar matters will be omitted.

This method (no. 2) is the same as the above-described method (no. 1) except that the microcapsule-containing layer is formed under vacuum (reduced pressure). That is, this method (no. 2) is the same as the above-described method (no. 1) aside from the step (A3) among the steps (A1) to (A6) of the method (no. 1). Therefore, the step (A3') of the method (no. 2) will be mainly described.

Figure 6A:
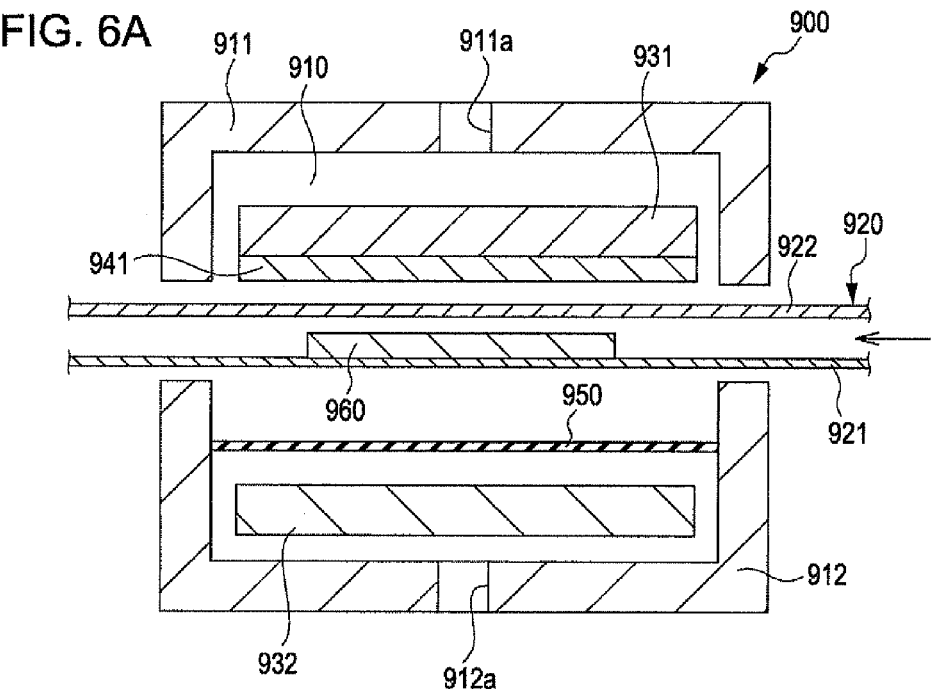
FIGS. 6A and 6B are schematic diagrams illustrating a device used in another method of producing the electrophoretic display device shown in FIG. 1.
Figure 6B:
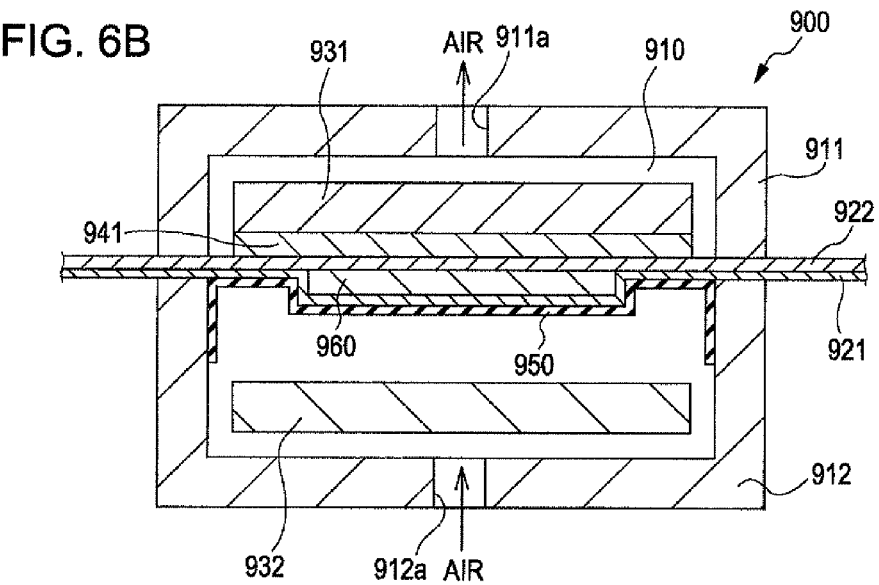

In the step (A3'), a vacuum laminator 900 shown in FIGS. 6A and 6B is used.

The vacuum laminator 900 has a first block body 911 and second block body 912. At least one of these block bodies can move up and down with a lifting device (not shown). The first block body 911 and the second block body 912 are brought into contact with each other via conveying films 921 and 922 described below to form a vacuum chamber 910 in the inside thereof.

The first block body 911 has a suction vent 911a for removing the air from the vacuum chamber 910, and the second block body 912 has an air supply vent 912a for inflating and deforming a diaphragm 950 described below.

The vacuum laminator 900 has conveyer 920 that is disposed between the first block body 911 and the second block body 912 and conveys a laminating object 960 to the vacuum chamber 910. The conveyer 920 has the conveying films 921 and 922, and this pair of conveying films 921 and 922 can be moved in the transverse direction (the direction shown by the arrow) in FIG. 6A by a driving device (not shown). In this conveyer 920, the laminating object 960 is conveyed to the vacuum chamber 910 by moving the conveying films 921 and 922 in the state that the laminating object 960 is placed on the conveying film 921.

The vacuum laminator 900 also has a first heater 931 and an upper surface plate 941 disposed on the lower side of the first heater 931, and the upper surface plate 941 can be heated to a predetermined temperature with the first heater 931. Both the first heater 931 and the upper surface plate 941 are disposed inside the first block body 911.

The vacuum laminator 900 further has a second heater 932 and the diaphragm 950 disposed inside the second block body 912. The diaphragm 950 is inflated and deformed as a balloon by a gas such as air supplied from the air supply vent 912a provided to the second block body 912 and thereby increasing the air pressure in the region surrounded by the diaphragm 950 and the second block body 912.

The vacuum laminator 900 having the structure described above is operated as follows. First, the first and the second heaters 931 and 932 are heated to a predetermined temperature, and a laminating object is conveyed in the vacuum chamber 910 by the conveyer 920. Then, the lifting device brings the first block body 911 and the second block body 912 into contact with each other via the conveying films 921 and 922. Subsequently, the air is removed through the suction vent 911a to make the vacuum chamber 910 vacuum, and, at the same time, the diaphragm 950 is inflated and deformed by the air supplied through the air supply vent 912a. By doing so, the laminating object 960 is sandwiched between the diaphragm 950 and the upper surface plate 941 and is pressurized in the thickness direction while being heated.

The step (A3') where the vacuum laminator 900 is used will be described below.

(A3') Step of Forming Microcapsule-containing Layer 400

Figure 7A:
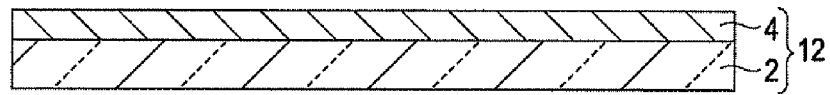
FIGS. 7A to 7D are schematic diagrams illustrating another method of producing the electrophoretic display device shown in FIG. 1.
Figure 7B:
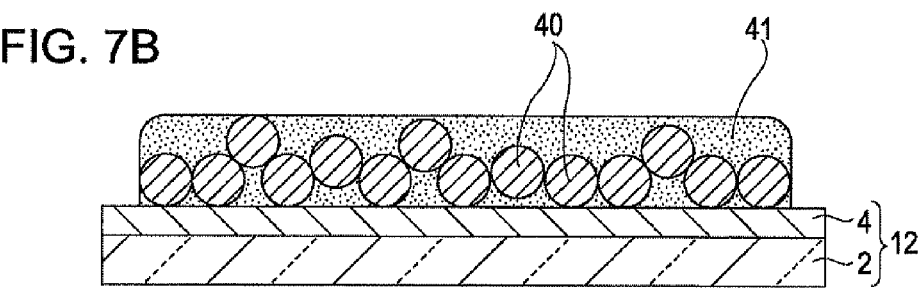

First, as in the above-described method (no. 1), as shown in FIG. 7A, a substrate 12 having a second electrode 4 is prepared. Then, as shown in FIG. 7B, the microcapsule dispersion prepared in the step (A2) is supplied onto the surface of the substrate 12 on the second electrode 4 side. Then, according to need, the microcapsule dispersion is leveled so that the thickness (amount) of the microcapsule dispersion is uniform at every portion on the second electrode 4 of the substrate 12.

Figure 7C:
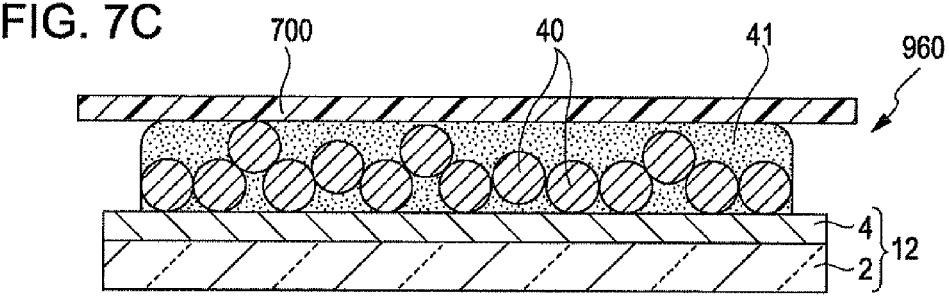

Then, a release sheet 700 is prepared, and, as shown in FIG. 7C, the release sheet 700 is put on the upper surface (the surface on the opposite side with respect to the substrate 12) of the microcapsule dispersion to cover the microcapsule dispersion. By doing so, a laminating object 960 is obtained.

The release sheet 700 may be a known sheet. For example, the release sheet 700 may be composed of a release agent layer constituted of, for example, a silicone release agent, a fluorine release agent, or modified silicone release agent formed on a plastic film, craft paper, polyethylene-laminated paper, polypropylene-laminated paper, or nonwoven fabric constituted of a main material being at least one selected from polyethylene terephthalate, high-pressure low-density polyethylene, high-density polyethylene, straight-chain low-density polyethylene, ethylene-vinyl acetate copolymer resins, non-oriented polypropylene, oriented polypropylene, and oriented nylon.

Figure 7D:
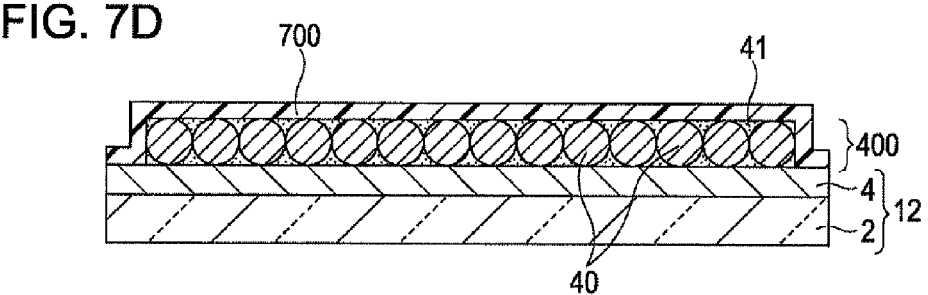

The thus obtained laminating object 960 is placed on the convey film 921 in such a manner, for example, that the release sheet 700 faces the convey film 921 and is heated and pressurized by the vacuum laminator 900 as described above. By doing so, as shown in FIG. 7D, an electrophoretic display sheet 21 where a single layer of the microcapsule-containing layer 400 is disposed on the second electrode 4 of the substrate 12 is obtained.

By thus-forming the microcapsule-containing layer 400 under vacuum, formation of air bubbles (air layer) in the microcapsule-containing layer 400 can be prevented, and the produced electrophoretic display device 20 can have excellent reliability.

The conditions for heating and pressurizing with the vacuum laminator 900 vary depending on, for example, hardness of the microcapsules 40. For example, the conditions can be a degree of vacuum of 133 Pa, a pressing force (pressure) of 0.9 MPa, a heating temperature of 100° C., and a heating time of 5 minutes. With this, the microcapsules 40 can maintain the spherical shapes thereof.

The material obtained in the step (A3') is subjected to the subsequent step (A4) after removing the release sheet 700.

This method also can give the electrophoretic display device 20.

In the thus-obtained electrophoretic display device 20, the microcapsules 40 contained in the microcapsule-containing layer 400 retain the spherical shapes and are arranged in the microcapsule-containing layer 400 so as to be in contact with one another in the lateral direction of the microcapsule-containing layer 400 and to form a single layer without overlapping in the thickness direction. As a result, the electrophoretic display device 20 has excellent contrast.

The circuit board 22 and the electrophoretic display sheet 21 may be joined to each other by disposing the adhesive layer 8 on the upper side of the microcapsule-containing layer 400 on the second electrode 4 of the substrate 12. Alternatively, the circuit board 22 and the electrophoretic display sheet 21 may be joined to each other by disposing the adhesive layer 8 on the circuit board 22 and also on the upper side of the microcapsule-containing layer 400 on the second electrode 4 of the substrate 12.

Electronic apparatus

The electrophoretic display device 20 can be incorporated into various electronic apparatuses. Electronic apparatuses according to an aspect of the invention, which have the electrophoretic display device 20, will be described below.

Electronic Paper

First, an embodiment where the electronic apparatus according to an aspect of the invention is applied to an electronic paper will be described.

Figure 8:
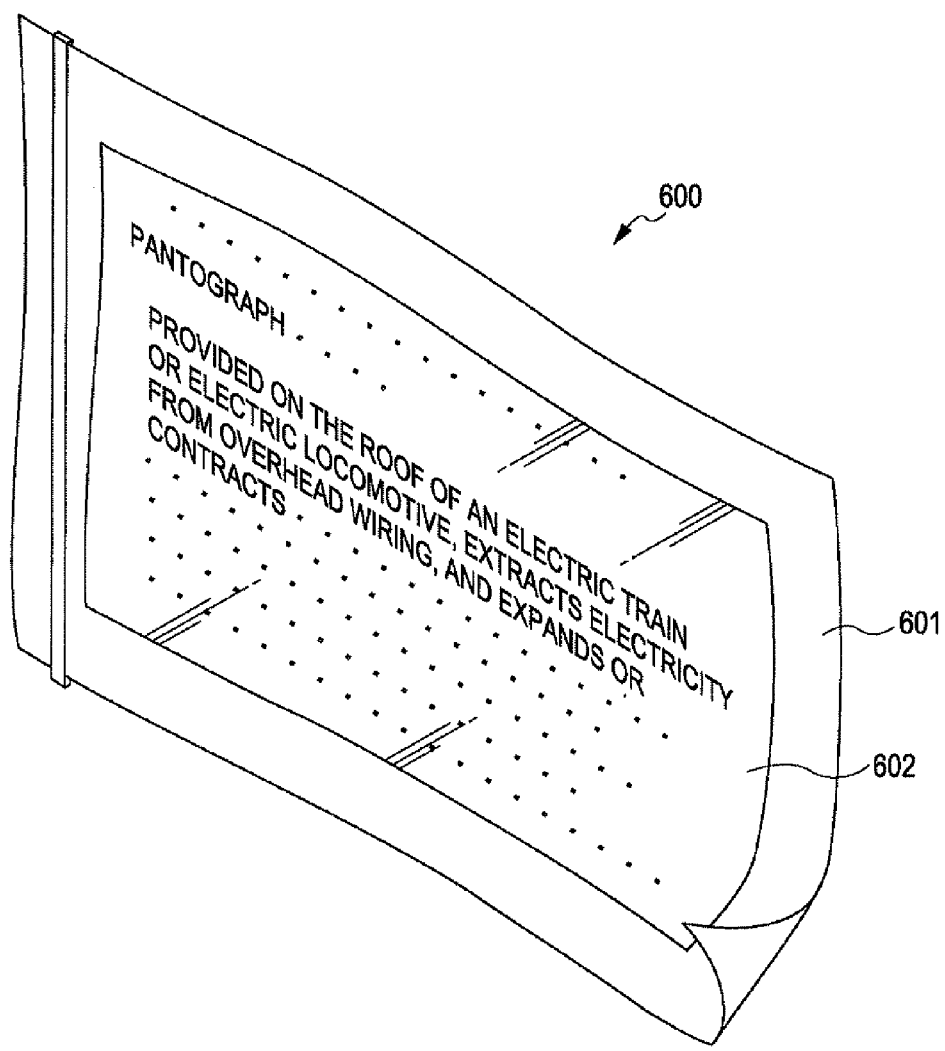
FIG. 8 is a perspective view illustrating an embodiment where the electronic apparatus of the invention is applied to an electronic paper.

FIG. 8 is a perspective view illustrating the embodiment where the electronic apparatus of the invention is applied to an electronic paper.

The electronic paper 600 shown in FIG. 8 includes a body 601 constituted of a rewritable sheet having texture and flexibility similar to those of paper and a display unit 602.

In this electronic paper 600, the display unit 602 is constituted of the above-described electrophoretic display device 20.

Display

Next, an embodiment where the electronic apparatus according to an aspect of the invention is applied to a display will be described.

Figure 9A:
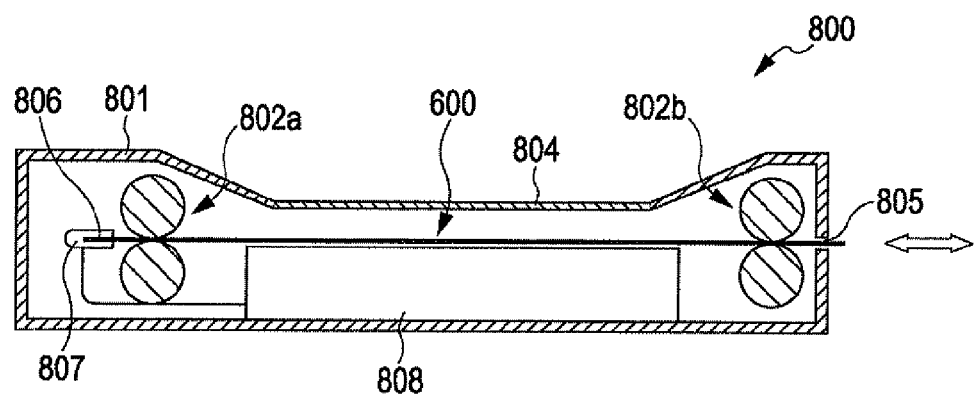
FIGS. 9A and 9B are diagrams illustrating an embodiment where the electronic apparatus of the invention is applied to a display.
Figure 9B:
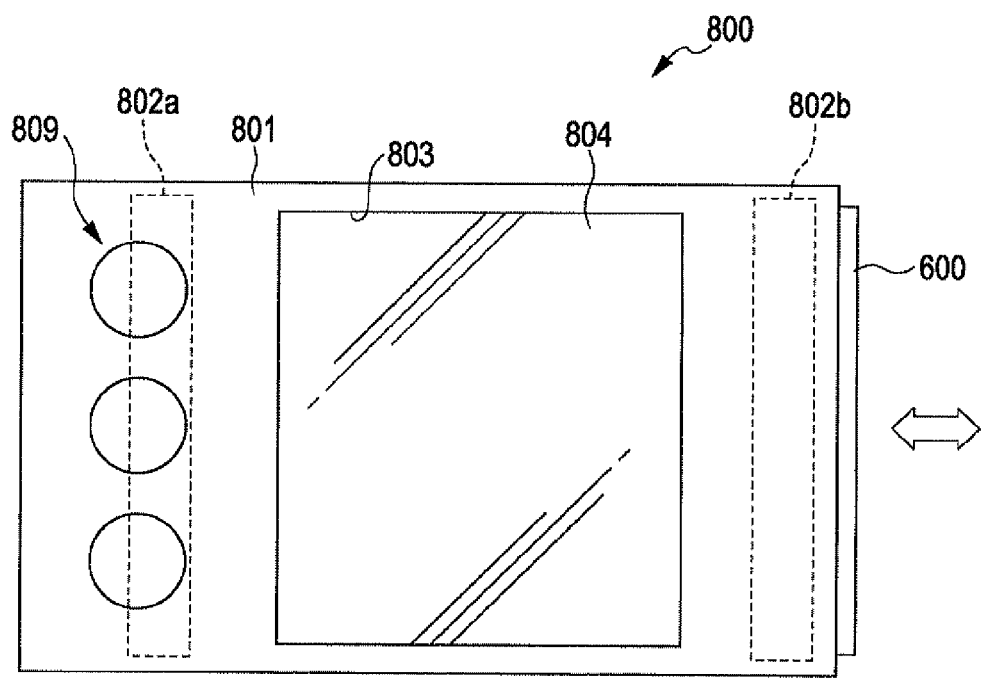

FIGS. 9A and 9B are diagrams illustrating an embodiment where the electronic apparatus of the invention is applied to a display. FIG. 9A is a cross-sectional view, and FIG. 9B is a plan view.

The display (display device) 800 shown in FIGS. 9A and 9B includes a body 801 and an electronic paper 600 detachably provided to the body 801. The electronic paper 600 has a structure similar to that described above, that is, a structure similar to that shown in FIG. 8.

The body 801 has a feeding inlet 805 into which the electronic paper 600 can be inserted at one side (the right side in FIG. 9A) and has two pairs of feeding rollers 802a and 802b in the inside. The electronic paper 600 inserted in the body 801 through the feeding inlet 805 is mounted on the body 801 in the state that the electronic paper 600 is held by the feeding rollers 802a and 802b.

In addition, the body 801 has a rectangular opening 803 at the display surface side (forward side in the plane of the paper of FIG. 9B) and a transparent glass plate fit into the opening 803. By doing so, the electronic paper 600 set to the body 801 can be visually recognized from the outside of the body 801. That is, in this display 800, the display surface is constituted of the electronic paper 600 set to the body 801 so as to be viewed through the transparent glass plate 804.

The electronic paper 600 is provided with a terminal portion 806 at the end in the feeding direction (left side in FIG. 9A), and a socket 807 that is connected to the terminal portion 806 when the electronic paper 600 is set to the body 801 is provided to the inside of the body 801. The socket 807 is electrically connected to a controller 808 and an operation portion 809.

In this display 800, the electronic paper 600 is detachably set to the body 801 and also can be carried with a user and used in the state of being detached from the body 801.

In this display 800, the electronic paper 600 is constituted of the above-described electrophoretic display device 20.

The electronic apparatus according to an aspect of the invention is not limited to the above-mentioned application, and examples thereof include televisions, view finder-type and monitor direct view-type video tape recorders, in-car navigation systems, pagers, electronic notepads, calculators, electronic newspapers, word processors, personal computers, workstations, TV telephones, POS terminals, and devices having touch panels. The electrophoretic display device 20 of the invention can be applied to the displays of these electronic apparatuses.

Based on the embodiments shown in the drawings, the electrophoretic display sheet production process, the display sheet, the display device, and the electronic apparatus of the invention have been described above, but the invention is not limited thereto, and the structure of each portion can be replaced by another one having an arbitrary structure that can exhibit a similar function. Furthermore, another arbitrary structure may be added to the invention.

Furthermore, the electrophoretic display device according to an aspect of the invention may be a combination of optional two or more structures (characteristics) of each of the above-described embodiments, such as a combination of the structures of the first and the second embodiments.

In the above-described embodiments, the cases in that the electrophoretic display sheet and the circuit board are joined via the adhesive layer have been described, but, in the invention, the adhesive layer may be provided according to need. For example, when the binder itself has sufficient adhesive properties, the adhesive layer may be omitted.

In the above-described embodiments, a pair of substrates is disposed so as to face each other. However, the invention is not limited thereto and can be applied to, for example, a structure having a single substrate.

In the above-described embodiments, the microcapsules are arranged in such a manner that one microcapsule overlaps two adjacent pixel electrodes (first electrodes). However, the invention is not limited thereto. For example, the microcapsules may be arranged in such a manner that one microcapsule overlaps three or more adjacent pixel electrodes or that one microcapsule overlaps one pixel electrode or that some microcapsules each overlap a plurality of pixel electrodes and other microcapsules each overlap one pixel electrode.

EXAMPLES

Specific examples of the present invention will be described below.

1. Production of Electrophoretic Display Sheet

An electrophoretic display sheet was produced as follows.

Experimental Example 1

(A1) Production of Microcapsules
(A1-1) Preparation of Electrophoretic Dispersion First, spherical white particles having an average particle diameter of 200 nm and spherical black particles having an average particle diameter of 60 nm were prepared.

Titanium oxide particles ("CR-90", a product of Ishihara Sangyo Kaisha, Ltd.) were used as the white particles, and carbon black was used as the black particles.

Then, the white particles and the black particles were dispersed at a weight ratio of 6:1 in a liquid-phase dispersion medium to prepare an electrophoretic dispersion.

As the liquid-phase dispersion medium, Isopar M (a product of ExxonMobil Chemical Co.) was used.

(A1-2) Preparation of Aqueous Suspension of Electrophoretic Dispersion

In a 500-mL beaker, 60 g of a 10 wt % aqueous gum arabic solution was weighed, and 50 g of the electrophoretic dispersion prepared in the step (A1-1) was added thereto with stir by Disper. Suspending was carried out to obtain an aqueous suspension of the electrophoretic dispersion.

(A1-3) Formation of First Capsule Layer

In a 100-mL round-bottom separable flask, 5 g of melamine, 5 g of urea, 20 g of a 27 wt % aqueous formaldehyde solution, and 1 g of 25 wt % ammonia water were fed and were heated to 70° C. with stirring. During the increase in temperature, the entire mixture became transparent at near 65° C. The temperature was increased to 70° C. and maintained at the temperature for 1 hour. Then, the mixture was cooled to 30° C. to obtain an initial condensation compound of melamine, urea, and formaldehyde.

Then, the initial condensation compound was added to the aqueous suspension of the electrophoretic dispersion that was obtained in the step (A1-2) and was retained at 40° C., followed by stirring at the same temperature for 2 hours. Then, the mixture was heated to 70° C., aged at the same temperature for 2 hours, and then cooled to ordinary temperature. Through the steps above, a first capsule layer made of a melamine-based resin was formed to obtain a dispersion of pre-microcapsules sealing the electrophoretic dispersion therein. One liter of deionized water was added to the pre-microcapsule dispersion, and the mixture was uniformly mixed and then left standing. After confirmation of sedimentation of the pre-microcapsules, the supernatant was removed. This procedure was repeated several times for washing.

The particle diameters of the pre-microcapsules were measured to confirm that the average particle diameter was 42 μm.

(A1-4) Formation of Second Capsule Layer

The whole amount of the pre-microcapsules obtained in the step (A1-3) was put in a 300-mL separable flask, and deionized water was added thereto to adjust the total amount to 200 g. This pre-microcapsule dispersion was heated to 40° C. with stirring, and a dispersion where 20 g of an epoxy compound ("Denacol EX521 (polyglycerol polyglycidyl ester)", a product of Nagase ChemteX Corp.) was dispersed in 50 g of water was dropwise added to the pre-microcapsule dispersion over 10 minutes. The mixture was maintained at the same temperature for 30 minutes, and then 1 g of a 2.5% aqueous sodium diethyldithiocarbamate solution being a cross-linking agent was added thereto, followed by a reaction for 2 hours. Then, the mixture was heated to 50° C. and aged at the same temperature for 2 hours to form a second capsule layer of an epoxy resin on the surface of the pre-microcapsule (first capsule layer).

Through the steps above, microcapsules where the electrophoretic dispersion was sealed in the capsule bodies each constituted of the first capsule layer and the second capsule layer were obtained.

The microcapsule dispersion was subjected to wet sorting using a mesh having a pore size of 38 μm and a mesh having a pore size of 32 μm to obtain microcapsules having a volume average particle diameter of 37.29 μm (CV value: 8.18%).

The particle size distribution was measured with a laser diffraction/scattering particle size distribution analyzer ("LA-910", a product of Horiba, Ltd.).

The CV value refers to (standard variation/average particle size)×100.

(A2) Preparation of Microcapsule Dispersion

Then, a microcapsule dispersion was prepared by mixing the microcapsules obtained in the step (A1) and a binder at a weight ratio of 10:3.

The binder was a mixture of butyl acrylate, 2-ethylhexyl acrylate, and polyethylene glycol (Mw=2000) at a weight ratio of 50:47:3.

(A3) Formation of Microcapsule-Containing Layer

Then, 10 sheets of PET-ITO substrates ("OTEC220B", a product of Oike & Co., Ltd.) where a film of ITO was formed on a base material of PET were prepared.

Then, the microcapsule dispersion obtained in the step (A2) was supplied onto the ITO of five sheets of the PET-ITO substrates (sample Nos. 1 to 5), and then the thickness was controlled by doctor blading to an average thickness of 45 μm. Similarly, the microcapsule dispersion obtained in the step (A2) was supplied onto the ITO of the other five sheets of the PET-ITO substrates (sample Nos. 6 to 10), and then the thickness was controlled by doctor blading to an average thickness of 50 μm.

The microcapsule dispersions supplied onto the PET-ITO substrates were investigated with a digital microscope ("VHX-600", a product of Keyence Corporation) and a lens ("VH-Z100", a product of Keyence Corporation) for observation of the conditions of the microcapsules in the microcapsule dispersion. In addition, visible light transmittance of the microcapsule dispersion was measured with a haze meter ("NDH5000", a product of Nippon Denshoku Industries Co., Ltd.).

These measurement results are shown in Table 1.

Then, a sheet with release agent layer ("SK Separator, K-80HS", a product of Sun A. Kaken Co., Ltd., base material: craft paper, release agent layer: silicone-based release agent) was disposed so as to cover the microcapsule dispersion supplied on the PET-ITO substrate, and the microcapsule dispersion was pressurized in the thickness direction of the PET-ITO substrate in the state that the microcapsule dispersion was disposed between the PET-ITO substrate and the sheet with release agent layer using a roller laminator ("VA-700DFR", a product of Taisei Laminator Co., Ltd.).

The conditions of the roller laminator for pressurization of the microcapsule dispersion were as follows:

Conditions of Laminator
 Laminating pressure: 0.4 MPa
 Laminating temperature: 70° C.
 Sheet conveying rate: 5 cm/min The microcapsule-containing layer formed between the PET-ITO substrate and the sheet with release agent layer had a length of 30 mm, a width of 30 mm, and an average thickness of 50 μm.

Then, the sheet with release agent layer was detached from the microcapsule dispersion. As a result, an electrophoretic display sheet provided with a microcapsule-containing layer on the PET-ITO substrate was obtained.

The microcapsule-containing layer formed on the PET-ITO substrate was investigated with a digital microscope ("VHX-600", a product of Keyence Corporation) and a lens ("VH-Z100", a product of Keyence Corporation) for observation of the conditions of the microcapsules in the microcapsule dispersion. In addition, visible light transmittance of the microcapsule-containing layer was measured with a haze meter ("NDH5000", a product of Nippon Denshoku Industries Co., Ltd.).

These measurement results are shown in Table 1.

TABLE 1

| | Before Pressurization | | After Pressurization | |
|---|---|---|---|---|
| | Microscopic observation | Visible light transmittance (%) | Microscopic observation | Visible light transmittance (%) |
| Sample No. 1 | 1.5 lines | 6.50 | 1.0 line | 8.09 |
| Sample No. 2 | 1.5 lines | 6.34 | 1.0 line | 8.07 |
| Sample No. 3 | 1.5 lines | 6.33 | 1.0 line | 8.06 |
| Sample No. 4 | 1.5 lines | 6.17 | 1.0 line | 7.91 |
| Sample No. 5 | 1.5 lines | 6.30 | 1.0 line | 7.92 |
| Sample No. 6 | 2.0 lines | 4.74 | 1.0 line | 7.90 |
| Sample No. 7 | 2.0 lines | 4.98 | 1.0 line | 7.97 |
| Sample No. 8 | 2.0 lines | 4.99 | 1.0 line | 7.89 |
| Sample No. 9 | 2.0 lines | 5.28 | 1.0 line | 7.92 |
| Sample No. 10 | 2.0 lines | 5.18 | 1.0 line | 7.94 |

As obvious from Table 1, it was observed that the microcapsules in the microcapsule dispersion were partially stacked in the thickness direction before the pressurization of the microcapsule dispersion with the roller laminator, but that the overlapping of the microcapsules in the thickness direction was eliminated by the pressurization with the roller laminator to form a single layer of the microcapsules.

Furthermore, it was confirmed that the visible light transmittance of the microcapsule-containing layer was 7.89 or more and 8.09 or less when the microcapsules were arranged to form a single layer without overlapping in the thickness direction in the microcapsule-containing layer and was 6.50 or less when the microcapsules overlaps one another in the thickness direction.

2. Production of Electrophoretic Display Device

An electrophoretic display sheet was produced as follows.

Experimental Example 2

Example 1

First, an electrophoretic display sheet having a microcapsule-containing layer that was the same as sample No. 1 after the pressurization was prepared as in Experimental Example 1. A PET-ITO substrate ("OTEC220B", a product of Oike & Co., Ltd.) was put on the microcapsule-containing layer of the electrophoretic display sheet to cover the microcapsule-containing layer. Then, the PET-ITO substrate was adhered to the microcapsule-containing layer using a roller laminator ("VA-7000DFR", a product of Taisei Laminator Co., Ltd.).

The conditions of the roller laminator for adhering the PET-ITO substrate to the microcapsule-containing layer were as follows:

Conditions of Laminator
  Laminating pressure: 0.2 MPa
  Laminating temperature: 50° C.
  Sheet conveying rate: 5 cm/min As a result, the electrophoretic display device of Example 1 was obtained.

The microcapsule-containing layer formed between two PET-ITO substrates had a length of 30 mm, a width of 30 mm, and an average thickness of 50 µm.

Example 2

An electrophoretic display device of Example 2 was obtained as in Example 1 except that the electrophoretic display sheet had a microcapsule-containing layer that was obtained as in sample No. 1 after pressurization by changing the binder contained in the microcapsule dispersion prepared in Experimental Example 1 to a mixture of butyl acrylate, 2-ethylhexyl acrylate, polyethylene glycol (Mw=2000), and methyl methacrylate in a weight ratio of 63:27:3:7.

Example 3

The electrophoretic display device of Example 3 was obtained as in Example 1 except that the electrophoretic display sheet had a microcapsule-containing layer that was obtained as in sample No. 1 after pressurization by pressurizing the microcapsule dispersion in the thickness direction of the PET-ITO substrate with a roller laminator in Experimental Example 1 and then further shifting the sheet with release agent layer by 150 µm in the lateral direction of the PET-ITO substrate.

Comparative Example

The electrophoretic display device of Comparative Example was obtained as in Example 1 except that the electrophoretic display sheet had a microcapsule-containing layer that was obtained as in sample No. 1 before pressurization by omitting the pressurization of the microcapsule dispersion in the thickness direction of the PET-ITO substrate with a roller laminator in Experimental Example 1.

White and black reflectances (Y values) when a direct current of 15 V was applied for 400 msec between the electrodes of the electrophoretic display device obtained in each Example and Comparative Example were measured using a Macbeth spectrophotometer/densitometer ("SpectroEye", a product of Gretag Macbeth Corp.). Note that the white and black reflectances were independently measured by switching the polarities of the applied direct current. The contrast was obtained by the following equation (1):

$$\text{Contrast}=(\text{white reflectance})/(\text{black reflectance}) \quad (1).$$

The evaluation results are shown in Table 2.

TABLE 2

| | White Reflectance (%) | Black Reflectance (%) | Contrast |
|---|---|---|---|
| Example 1 | 51.7 | 3.3 | 15.7 |
| Example 2 | 49.4 | 4.3 | 11.5 |
| Example 3 | 52.4 | 3.0 | 17.5 |
| Comparative Example | 48.3 | 6.7 | 7.2 |

As shown Table 2, all the electrophoretic display devices of Examples exhibited excellent contrast with high white reflectance and low black reflectance.

In particular, the electrophoretic display device of Example 3 wherein the sheet with release agent layer was shifted in the lateral direction thereof after pressurization in the thickness direction of the PET-ITO substrate exhibited highly excellent contrast.

On the other hand, in Comparative Example, the white reflectance was low, the black reflectance was high, and therefore the contrast was inferior to those in Examples.

Experimental Example 3

Example 4

First, as in Experimental Example 1, an electrophoretic display sheet having a microcapsule-containing layer of sample No. 1 after pressurization was prepared. A low-temperature polycrystalline silicon (LTPS) substrate prepared in advance was placed on the microcapsule-containing layer of the electrophoretic display sheet so as to cover the microcapsule-containing layer. Then, the LTPS substrate was adhered to the microcapsule-containing layer using a roller laminator ("VA-700DFR", a product of Taisei Laminator Co., Ltd.).

The conditions of the roller laminator for adhering the LTPS substrate to the microcapsule-containing layer were as follows:

Conditions of Laminator
  Laminating pressure: 0.4 MPa
  Laminating temperature: 70° C.
  Sheet conveying rate: 5 cm/min As a result, the electrophoretic display device of Example 4 was obtained.

The microcapsule-containing layer formed between the PET-ITO substrate and the LTPS substrate had a length of 30 mm, a width of 30 mm, and an average thickness of 50 µm.

The electrophoretic display device of Example 4 was subjected to ion milling using a sample forming device ("SM-09010", a product of JEOL Ltd.) to form an observation cross-section. The observation cross-section was sputtered and then observed with a scanning electron microscope.

Figure 10:
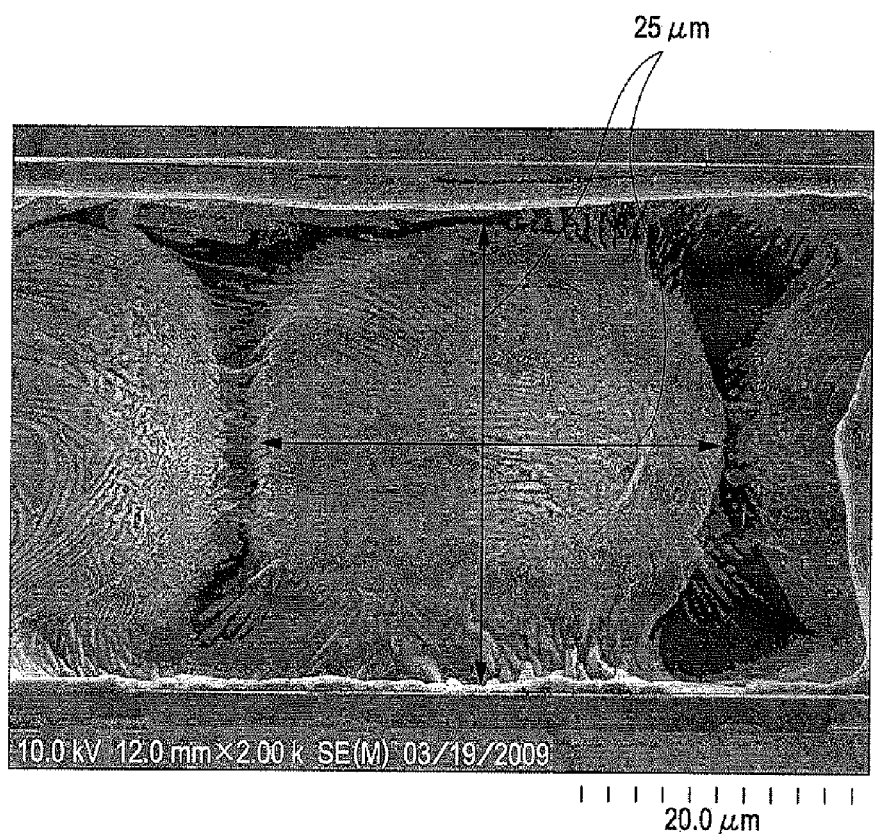
FIG. 10 is an electron micrograph of an observation cross-section (longitudinal section) of the electrophoretic display device of Example 4.

The electron micrograph of the observation cross-section is shown in FIG. 10.

As shown in FIG. 10, in the microcapsule held between the LTPS substrate and the PET-ITO substrate, the width and the height were both 25 µm. Thus, the microcapsule 40 had a width/height value of 1.0 and maintained its approximately spherical shape between the LTPS substrate and the PET-ITO substrate.

What is claimed is:

1. A method of producing an electrophoretic display sheet having:
   a substrate; and
   a microcapsule-containing layer disposed on one surface side of the substrate and including microcapsules and a binder holding the microcapsules, the microcapsules each composed of a shell and an electrophoretic dispersion liquid sealed in the shell and containing at least one type of electrophoretic particles, the method comprising the step of:
   forming the microcapsule-containing layer where the microcapsules are arranged in a single layer without overlapping in the thickness direction of the substrate by supplying a microcapsule dispersion containing the microcapsules and the binder onto the substrate and then pressurizing the microcapsule dispersion in the thickness direction of the substrate wherein the content percentage of the microcapsules in the microcapsule-containing layer is 50 wt % or more and 95 wt % or less.

2. The method according to claim 1, wherein the microcapsules are arranged in the microcapsule-containing layer so as to be in contact with one another in the lateral direction of the substrate.

3. The method according to claim 1, wherein the microcapsules are present in approximately spherical shapes in the microcapsule-containing layer.

4. The method according to claim 1, wherein the binder has a glass transition temperature of −50° C. or more and 10° C. or less.

5. The method according to claim 4, wherein the binder contains a polyalkalene glycol resin having a weight average molecular weight of 200 or more and 100000 or less.

6. The method according to claim 1, wherein the pressurization of the microcapsule dispersion in the thickness direction of the substrate is performed by preparing a plate-like pressing substrate, disposing the pressing substrate on the microcapsule dispersion on the opposite side of the substrate, and pressurizing the microcapsule dispersion in the direction that the substrate and the pressing substrate come closer to each other.

7. The method according to claim 6, wherein the intensity of the pressure applied between the substrate and the pressing substrate is 0.4 MPa or more and 1.5 MPa or less.

8. The method according to claim 6, wherein the pressing substrate is detached from the microcapsule dispersion after pressurizing the microcapsule dispersion in the direction that the substrate and the pressing substrate come closer to each other.

9. The method according to claim 8, wherein the pressing substrate is composed of a base material and a release agent layer formed on a surface of the base material.

10. The method according to claim 9, wherein the release agent layer is constituted of a main material being at least one selected from the group consisting of silicone release agents, fluorine release agents, and modified silicone release agents.

11. An electrophoretic display sheet produced by the method according to claim 1.

12. An electrophoretic display device comprising the electrophoretic display sheet according to claim 11.

13. An electronic apparatus comprising the electrophoretic display device according to claim 12.

14. A method of producing an electrophoretic display sheet having:

a substrate; and a microcapsule-containing layer disposed on one surface side of the substrate and including microcapsules and a binder holding the microcapsules, the microcapsules each composed of a shell and an electrophoretic dispersion liquid sealed in the shell and containing at least one type of electrophoretic particles, the method comprising the step of:

forming the microcapsule-containing layer where the microcapsules are arranged in a single layer without overlapping in the thickness direction of the substrate by supplying a microcapsule dispersion containing the microcapsules and the binder onto the substrate and then pressurizing the microcapsule dispersion in the thickness direction of the substrate wherein the content percentage of the microcapsules in the microcapsule-containing layer is 50 wt % or more and 95 wt % or less and a ratio of the microcapsule width to the microcapsule height (width/height of the microcapsules) is 1.0 or more and 1.2 or less.

15. An electrophoretic display sheet produced by the method according to claim 14.

* * * * *